(12) United States Patent
Badrinarayanan et al.

(10) Patent No.: US 11,128,854 B2
(45) Date of Patent: Sep. 21, 2021

(54) IMAGE-ENHANCED DEPTH SENSING VIA DEPTH SENSOR CONTROL

(71) Applicant: Magic Leap, Inc., Plantation, FL (US)

(72) Inventors: Vijay Badrinarayanan, Mountain View, CA (US); Zhao Chen, Mountain View, CA (US); Andrew Rabinovich, San Francisco, CA (US); Elad Joseph, Haifa (IL)

(73) Assignee: Magic Leap, Inc., Plantation, FL (US)

( * ) Notice: Subject to any disclaimer, the term of this patent is extended or adjusted under 35 U.S.C. 154(b) by 158 days.

(21) Appl. No.: 16/352,522

(22) Filed: Mar. 13, 2019

(65) Prior Publication Data
US 2019/0289281 A1    Sep. 19, 2019

Related U.S. Application Data

(60) Provisional application No. 62/642,528, filed on Mar. 13, 2018.

(51) Int. Cl.
*G06K 9/00* (2006.01)
*H04N 13/271* (2018.01)
(Continued)

(52) U.S. Cl.
CPC ........... *H04N 13/271* (2018.05); *G06T 7/593* (2017.01); *H04N 13/128* (2018.05);
(Continued)

(58) Field of Classification Search
CPC .............. H04N 13/271; H04N 13/128; H04N 2013/0081; G06T 7/593; G06T 19/006; G01S 17/86
See application file for complete search history.

(56) References Cited

U.S. PATENT DOCUMENTS

2013/0136307 A1\* 5/2013 Yu .............................. G06T 7/12
382/103
2013/0201355 A1\* 8/2013 Seki ................... H04N 5/23218
348/207.1
(Continued)

OTHER PUBLICATIONS

Eigen, et al., "Depth Map Prediction from a Single Image using a Multi-Scale Deep Network", Dept. of Computer Science, Courant Institute, New York University, Available online at <URL: https://arxiv.org/abs/1406.2283, Jun. 9, 2014, 9 pages.
(Continued)

*Primary Examiner* — Solomon G Bezuayehu
(74) *Attorney, Agent, or Firm* — Kilpatrick Townsend & Stockton LLP

(57) ABSTRACT

Systems and methods are disclosed for computing depth maps. One method includes capturing, using a camera, a camera image of a runtime scene. The method may also include analyzing the camera image of the runtime scene to determine a plurality of target sampling points at which to capture depth of the runtime scene. The method may further include adjusting a setting associated with a low-density depth sensor based on the plurality of target sampling points. The method may further include capturing, using the low-density depth sensor, a low-density depth map of the runtime scene at the plurality of target sampling points. The method may further include generating a computed depth map of the runtime scene based on the camera image of the runtime scene and the low-density depth map of the runtime scene.

17 Claims, 20 Drawing Sheets

(51) Int. Cl.
*H04N 13/128* (2018.01)
*G06T 7/593* (2017.01)
*H04N 13/00* (2018.01)
*G06T 19/00* (2011.01)

(52) U.S. Cl.
CPC .. *G06T 19/006* (2013.01); *G06T 2207/10028* (2013.01); *H04N 2013/0081* (2013.01)

(56) References Cited

U.S. PATENT DOCUMENTS

| | | | |
|---|---|---|---|
| 2014/0118482 A1* | 5/2014 | Noh | H04N 13/257 348/36 |
| 2015/0248764 A1 | 9/2015 | Keskin et al. | |
| 2016/0086318 A1* | 3/2016 | Hannuksela | G01S 17/36 348/43 |
| 2017/0330365 A1* | 11/2017 | Adamov | H04L 67/10 |
| 2018/0096489 A1 | 4/2018 | Cohen et al. | |
| 2018/0211401 A1* | 7/2018 | Lee | G06K 9/6202 |
| 2018/0225805 A1* | 8/2018 | Brandt | H04N 5/23238 |
| 2018/0226105 A1* | 8/2018 | Brandt | G11B 27/031 |
| 2018/0293748 A1* | 10/2018 | Lee | H04N 13/239 |
| 2019/0132570 A1* | 5/2019 | Chen | H04N 5/232 |
| 2019/0156504 A1* | 5/2019 | Jiang | G06T 17/20 |
| 2019/0181171 A1 | 6/2019 | Tadmor et al. | |
| 2019/0297238 A1* | 9/2019 | Klosterman | H04N 5/23218 |
| 2020/0084429 A1* | 3/2020 | Barron | G06T 7/38 |
| 2020/0162655 A1* | 5/2020 | Zhou | G05D 1/12 |

OTHER PUBLICATIONS

PCT/US2019/022086, "International Search Report and Written Opinion", dated May 29, 2019, 9 pages.
Uhrig, et al., "Sparsity Invariant CNNs", Available online at https://arxiv.org/pdf/1708.06500.pdf, Aug. 30, 2017, 16 pages.
EP19767228.0, "Extended European Search Report", dated Mar. 22, 2021, 10 pages.
Song, et al., "Deep Depth Super-Resolution : Learning Depth Super-Resolution using Deep Convolutional Neural Network", Proceedings ICIAP: 17th International Conference on Image Analysis And Processing, 2013, 13 pages.

* cited by examiner

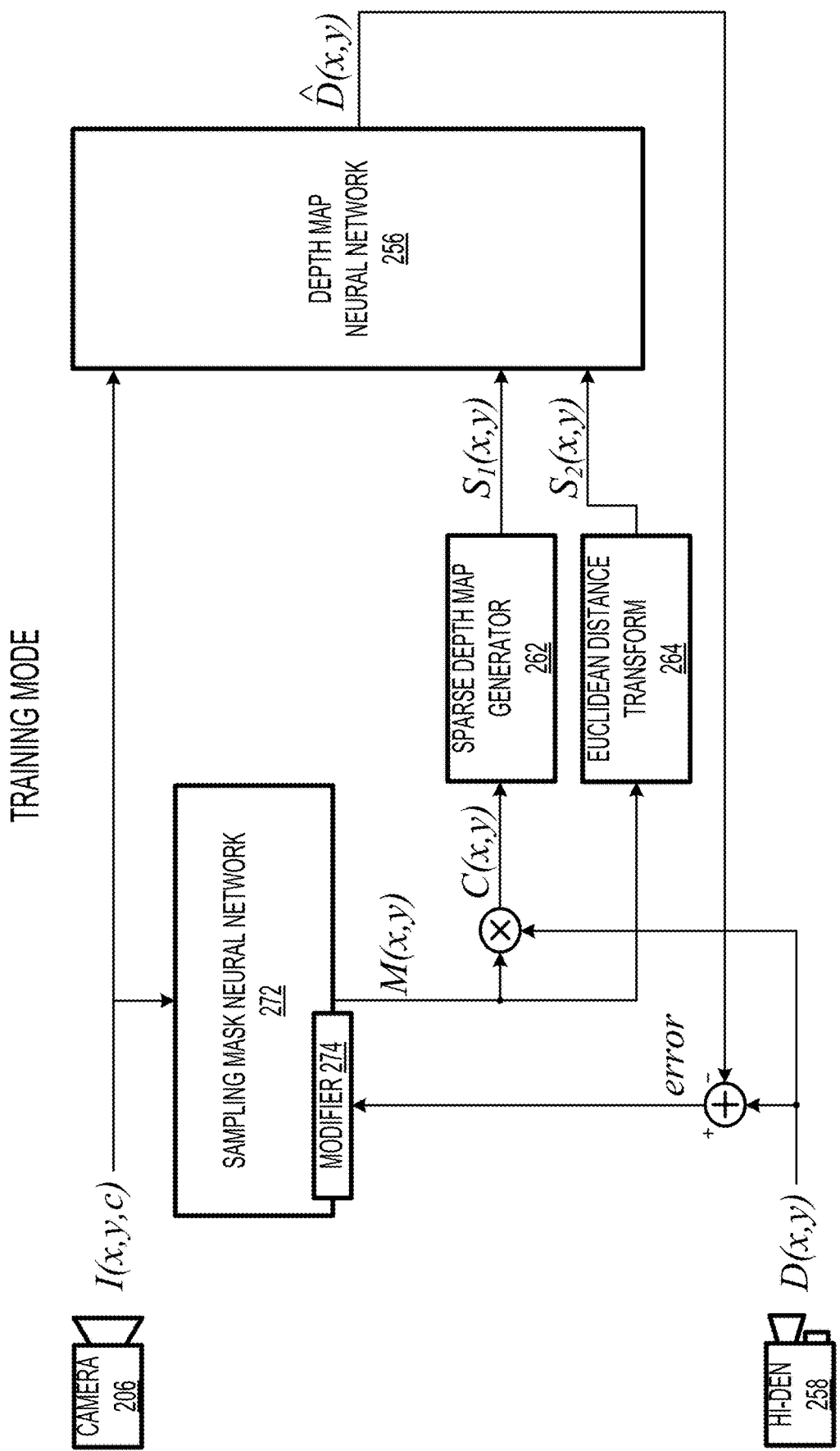

IMAGE-ENHANCED DEPTH SENSING VIA DEPTH SENSOR CONTROL

CROSS-REFERENCES TO RELATED APPLICATIONS

This application claims priority to U.S. Provisional Patent Application No. 62/642,528 filed Mar. 13, 2018 titled "SYSTEM AND METHOD FOR CONSTRUCTING DEPTH MAPS", the entire disclosure of which is hereby incorporated by reference, for all purposes, as if fully set forth herein.

BACKGROUND OF THE INVENTION

A wide range of technologies rely on the availability of accurate and up-to-date depth maps of the real world. Autonomous vehicles may use depth maps of their surroundings to generate navigation paths and to identify obstacles and relevant signage. Augmented reality (AR) devices may use depth maps to generate and project virtual image elements onto an optical head-mounted display, a monitor, or a handheld device that are perceived by a user to be situated properly in relation to the real-world objects surrounding the virtual elements. As another example, gaming devices may use depth maps to enable a user to control and interact with a console or a computer using his/her body, thereby replacing or supplementing other game controllers. Such depth maps may comprise a two-dimensional (2D) image containing pixel values corresponding to the distances between points in a scene and a particular reference point, such as a reference point of the depth sensor that captured the distances.

Depth map sensors may employ various technologies that utilize the transmission of light, electromagnetic, and/or acoustic signals, many of which operate on the time of flight principle that relates the time between a signal being transmitted and a reflected signal being received to the distance between the depth map sensor and the objected causing the reflection. The popularity of light-based approaches has grown significantly given the accuracy and speed at which data can be collected. For example, LiDAR sensors, which utilize the differences in return times and wavelengths of transmitted pulsed laser light, have become nearly ubiquitous in many depth sensing applications such as self-driving cars and unmanned aerial vehicles.

One notable application of depth sensing has been for virtual reality (VR) or AR display systems, in which digitally reproduced images or portions thereof are presented to a user in a manner wherein they seem to be, or may be perceived as, real. A VR scenario typically involves presentation of digital or virtual image information without transparency to other actual real-world visual input, and AR scenario typically involves presentation of digital or virtual image information as an augmentation to visualization of the actual world around the user. Despite the progress made with current depth sensing technologies, there remains a need for accurate, low-cost, and lightweight depth sensors that may be employed with VR and AR headsets.

SUMMARY OF THE INVENTION

The present invention relates generally to methods and systems for computing depth maps in computer vision applications. More particularly, embodiments of the present disclosure provide systems and methods for taking a very small amount of depth information as input and producing extremely high-quality, dense depth maps. The flexible parametrization of the sparse depth information leads to models which, even at fairly aggressive downsampling factors, produce mean absolute relative errors indoors of under 1%, comparable to the performance of full hardware depth sensors. The trainable network as described herein can be applied to outdoors datasets concurrently, achieving good accuracies for all depths, for example, from 1 m to 80 m. Although the present invention is described in reference to an AR device, the disclosure is applicable to a variety of applications in computer vision and image display systems. A summary of the invention is provided in reference to the examples described below. As used below, any reference to a series of examples is to be understood as a reference to each of those examples disjunctively (e.g., "Examples 1-4" is to be understood as "Examples 1, 2, 3, or 4").

Example 1 is a method of training a neural network for depth computation, the method comprising: providing an image input to the neural network, the image input including a camera image of a training scene; providing a depth input to the neural network, the depth input including: a sparse depth map of the training scene, wherein the sparse depth map is generated by: for each of a plurality of sampling points defined by a sampling mask, setting the sparse depth map equal to a high-density depth map of the training scene generated using a high-density depth sensor; and for each of a plurality of remaining points defined by the sampling mask, setting the sparse depth map equal to the high-density depth map at a nearest point of the plurality of sampling points; and a distance map of the training scene, wherein the distance map is generated by: for each of the plurality of sampling points, setting the distance map equal to zero; and for each of the plurality of remaining points, setting the distance map equal to a distance from the nearest point of the plurality of sampling points; generating, using the neural network, a computed depth map of the training scene based on the image input and the depth input; computing an error between the computed depth map and the high-density depth map; and modifying the neural network based on the error.

Example 2 is a method of training a neural network for depth computation, the method comprising: providing an image input to the neural network, the image input including a camera image of a training scene; providing a depth input to the neural network, the depth input based at least in part on a high-density depth map of the training scene; generating, using the neural network, a computed depth map of the training scene; and modifying the neural network based on an error between the computed depth map and the high-density depth map.

Example 3 is the method of example(s) 2, further comprising: generating, using the neural network, the computed depth map based on the image input and the depth input.

Example 4 is the method of example(s) 2-3, further comprising: capturing, using a camera, the camera image; and capturing, using a high-density depth sensor, the high-density depth map.

Example 5 is the method of example(s) 2-4, wherein the camera image is a grayscale image having dimensions of H×W×1.

Example 6 is the method of example(s) 2-5, wherein the camera image is an RGB image having dimensions of H×W×3.

Example 7 is the method of example(s) 2-6, wherein the depth input includes a sparse depth map generated based on: the high-density depth map; and a sampling mask that indicates a plurality of sampling points of a low-density depth sensor.

Example 8 is the method of example(s) 2-7, wherein the sparse depth map is generated by: for each of the plurality of sampling points, setting the sparse depth map equal to the high-density depth map; and for each of a plurality of remaining points, setting the sparse depth map equal to the high-density depth map at a nearest point of the plurality of sampling points.

Example 9 is the method of example(s) 2-8, wherein the depth input further includes a distance map generated by: for each of the plurality of sampling points, setting the distance map equal to zero; and for each of a plurality of remaining points, setting the distance map equal to a distance from a nearest point of the plurality of sampling points.

Example 10 is a method of using a neural network for depth computation, the method comprising: capturing, using a camera, a camera image of a runtime scene; capturing, using a low-density depth sensor, a low-density depth map of the runtime scene; providing a runtime image input to the neural network, the runtime image input including the camera image of the runtime scene; providing a runtime depth input to the neural network, the runtime depth input based at least in part on the low-density depth map of the runtime scene; and generating, using the neural network, a computed depth map of the runtime scene based on the runtime image input and the runtime depth input.

Example 11 is the method of example(s) 10, wherein the runtime depth input includes a sparse depth map of the runtime scene generated by: for each of a plurality of sampling points determined by the low-density depth map of the runtime scene, setting the sparse depth map of the runtime scene equal to the low-density depth map of the runtime scene; and for each of a plurality of remaining points, setting the sparse depth map of the runtime scene equal to the low-density depth map of the runtime scene at a nearest point of the plurality of sampling points.

Example 12 is the method of example(s) 10-11, wherein the runtime depth input includes a distance map of the runtime scene generated by: for each of a plurality of sampling points determined by the low-density depth map of the runtime scene, setting the distance map of the runtime scene equal to zero; and for each of the plurality of remaining points, setting the distance map of the runtime scene equal to a distance from the nearest point of the plurality of sampling points.

Example 13 is the method of example(s) 10-12, wherein the neural network was previously trained by: providing a training image input to the neural network, the training image input including a camera image of a training scene; providing a training depth input to the neural network, the training depth input based at least in part on a high-density depth map of the training scene; generating, using the neural network, a computed depth map of the training scene; and modifying the neural network based on an error between the computed depth map of the training scene and the high-density depth map of the training scene.

Example 14 is the method of example(s) 11-13, further comprising: generating, using the neural network, the computed depth map based on the training image input and the training depth input.

Example 15 is the method of example(s) 11-14, further comprising: capturing, using the camera, the camera image of the training scene; and capturing, using a high-density depth sensor, the high-density depth map of the training scene.

Example 16 is the method of example(s) 11-15, wherein the camera image of the training scene is a grayscale image having dimensions of H×W×1.

Example 17 is the method of example(s) 11-16, wherein the camera image of the training scene is an RGB image having dimensions of H×W×3.

Example 18 is the method of example(s) 11-17, wherein the training depth input includes a sparse depth map of the training scene generated based on: the high-density depth map; and a sampling mask that indicates a plurality of sampling points of the low-density depth sensor.

Example 19 is the method of example(s) 11-18, wherein the sparse depth map of the training scene is generated by: for each of the plurality of sampling points, setting the sparse depth map of the training scene equal to the high-density depth map; and for each of a plurality of remaining points, setting the sparse depth map of the training scene equal to the high-density depth map at a nearest point of the plurality of sampling points.

Example 20 is the method of example(s) 11-19, wherein the training depth input further includes a distance map of the training scene generated by: for each of the plurality of sampling points, setting the distance map of the training scene equal to zero; and for each of a plurality of remaining points, setting the distance map of the training scene equal to a distance from a nearest point of the plurality of sampling points.

Example 21 is a method of computing depth maps, the method comprising: capturing, using a camera, a camera image of a runtime scene; analyzing the camera image of the runtime scene to determine a plurality of target sampling points at which to capture depth of the runtime scene; adjusting a setting associated with a low-density depth sensor based on the plurality of target sampling points; capturing, using the low-density depth sensor, a low-density depth map of the runtime scene at the plurality of target sampling points; and generating a computed depth map of the runtime scene based on the camera image of the runtime scene and the low-density depth map of the runtime scene.

Example 22 is the method of example(s) 21, wherein analyzing the camera image of the runtime scene to determine the plurality of target sampling points includes: detecting one or more interest points in the camera image of the runtime scene; and determining the plurality of target sampling points based on the one or more interest points.

Example 23 is the method of example(s) 21-22, wherein analyzing the camera image of the runtime scene to determine the plurality of target sampling points includes: generating, using a neural network, the plurality of target sampling points based on the camera image of the runtime scene.

Example 24 is the method of example(s) 21-23, wherein the neural network was previously trained using a camera image of a training scene captured by the camera and a high-density depth map of the training scene captured by a high-density depth sensor.

Example 25 is the method of example(s) 21-24, wherein adjusting the setting associated with the low-density depth sensor based on the plurality of target sampling points includes: causing a transmitter of the low-density depth sensor to transmit signals to the plurality of target sampling points; and causing a first subset of a plurality of pixel receivers of the low-density depth sensor to be powered and a second subset of the plurality of pixel receivers to be unpowered, wherein the first subset corresponds to the plurality of target sampling points, and wherein powering the first subset causes the first subset to receive reflected signals from the plurality of target sampling points.

Example 26 is the method of example(s) 21-25, wherein adjusting the setting associated with the low-density depth sensor based on the plurality of target sampling points includes: causing a transmitter of the low-density depth sensor to sequentially transmit signals to the plurality of target sampling points; and causing a receiver of the low-density depth sensor to receive reflected signals from the plurality of target sampling points.

Example 27 is the method of example(s) 21-26, wherein generating a computed depth map of the runtime scene based includes: generating, using a neural network, the computed depth map of the runtime scene based on the camera image of the runtime scene and the low-density depth map of the runtime scene.

Example 28 is a system for computing depth maps, the system comprising: a camera; a low-density depth sensor; and one or more processors configured to perform operations including: capturing, using the camera, a camera image of a runtime scene; analyzing the camera image of the runtime scene to determine a plurality of target sampling points at which to capture depth of the runtime scene; adjusting a setting associated with the low-density depth sensor based on the plurality of target sampling points; capturing, using the low-density depth sensor, a low-density depth map of the runtime scene at the plurality of target sampling points; and generating a computed depth map of the runtime scene based on the camera image of the runtime scene and the low-density depth map of the runtime scene.

Example 29 is the system of example(s) 28, wherein analyzing the camera image of the runtime scene to determine the plurality of target sampling points includes: detecting one or more interest points in the camera image of the runtime scene; and determining the plurality of target sampling points based on the one or more interest points.

Example 30 is the system of example(s) 28-29, wherein analyzing the camera image of the runtime scene to determine the plurality of target sampling points includes: generating, using a neural network, the plurality of target sampling points based on the camera image of the runtime scene.

Example 31 is the system of example(s) 28-30, wherein the neural network was previously trained using a camera image of a training scene captured by the camera and a high-density depth map of the training scene captured by a high-density depth sensor.

Example 32 is the system of example(s) 28-31, wherein adjusting the setting associated with the low-density depth sensor based on the plurality of target sampling points includes: causing a transmitter of the low-density depth sensor to transmit signals to the plurality of target sampling points; and causing a first subset of a plurality of pixel receivers of the low-density depth sensor to be powered and a second subset of the plurality of pixel receivers to be unpowered, wherein the first subset corresponds to the plurality of target sampling points, and wherein powering the first subset causes the first subset to receive reflected signals from the plurality of target sampling points.

Example 33 is the system of example(s) 28-32, wherein adjusting the setting associated with the low-density depth sensor based on the plurality of target sampling points includes: causing a transmitter of the low-density depth sensor to sequentially transmit signals to the plurality of target sampling points; and causing a receiver of the low-density depth sensor to receive reflected signals from the plurality of target sampling points.

Example 34 is the system of example(s) 28-33, wherein generating a computed depth map of the runtime scene based includes: generating, using a neural network, the computed depth map of the runtime scene based on the camera image of the runtime scene and the low-density depth map of the runtime scene.

Example 35 is a non-transitory computer-readable medium comprising instructions that, when executed by a processor, cause the processor to perform operations comprising: capturing, using a camera, a camera image of a runtime scene; analyzing the camera image of the runtime scene to determine a plurality of target sampling points at which to capture depth of the runtime scene; adjusting a setting associated with a low-density depth sensor based on the plurality of target sampling points; capturing, using the low-density depth sensor, a low-density depth map of the runtime scene at the plurality of target sampling points; and generating a computed depth map of the runtime scene based on the camera image of the runtime scene and the low-density depth map of the runtime scene.

Example 36 is the non-transitory computer-readable medium of example(s) 35, wherein analyzing the camera image of the runtime scene to determine the plurality of target sampling points includes: detecting one or more interest points in the camera image of the runtime scene; and determining the plurality of target sampling points based on the one or more interest points.

Example 37 is the non-transitory computer-readable medium of example(s) 35-36, wherein analyzing the camera image of the runtime scene to determine the plurality of target sampling points includes: generating, using a neural network, the plurality of target sampling points based on the camera image of the runtime scene.

Example 38 is the non-transitory computer-readable medium of example(s) 35-37, wherein the neural network was previously trained using a camera image of a training scene captured by the camera and a high-density depth map of the training scene captured by a high-density depth sensor.

Example 39 is the non-transitory computer-readable medium of example(s) 35-38, wherein adjusting the setting associated with the low-density depth sensor based on the plurality of target sampling points includes: causing a transmitter of the low-density depth sensor to transmit signals to the plurality of target sampling points; and causing a first subset of a plurality of pixel receivers of the low-density depth sensor to be powered and a second subset of the plurality of pixel receivers to be unpowered, wherein the first subset corresponds to the plurality of target sampling points, and wherein powering the first subset causes the first subset to receive reflected signals from the plurality of target sampling points.

Example 40 is the non-transitory computer-readable medium of example(s) 35-39, wherein adjusting the setting associated with the low-density depth sensor based on the plurality of target sampling points includes: causing a transmitter of the low-density depth sensor to sequentially transmit signals to the plurality of target sampling points; and causing a receiver of the low-density depth sensor to receive reflected signals from the plurality of target sampling points.

Numerous benefits are achieved by way of the present disclosure over conventional techniques. For example, a single deep network model for dense scene depth estimation is described that is comparable to conventional depth sensor accuracy for both indoor and outdoor scenes. Additionally, a flexible, invertible method of parametrizing sparse depth inputs is described. This allows easy adaptation of the model to arbitrary sampling patterns from diverse sources (time of flight depth sensors, LIDAR, stereo matching, etc.) and even allows adaptation of a single model to multiple sparse patterns. Other benefits of the present disclosure will be readily apparent to those skilled in the art.

BRIEF DESCRIPTION OF THE DRAWINGS

FIGS. 5A, 5B, and 5C illustrate schematic views of various training modes of an AR device.

DETAILED DESCRIPTION OF SPECIFIC EMBODIMENTS

Figure 1:
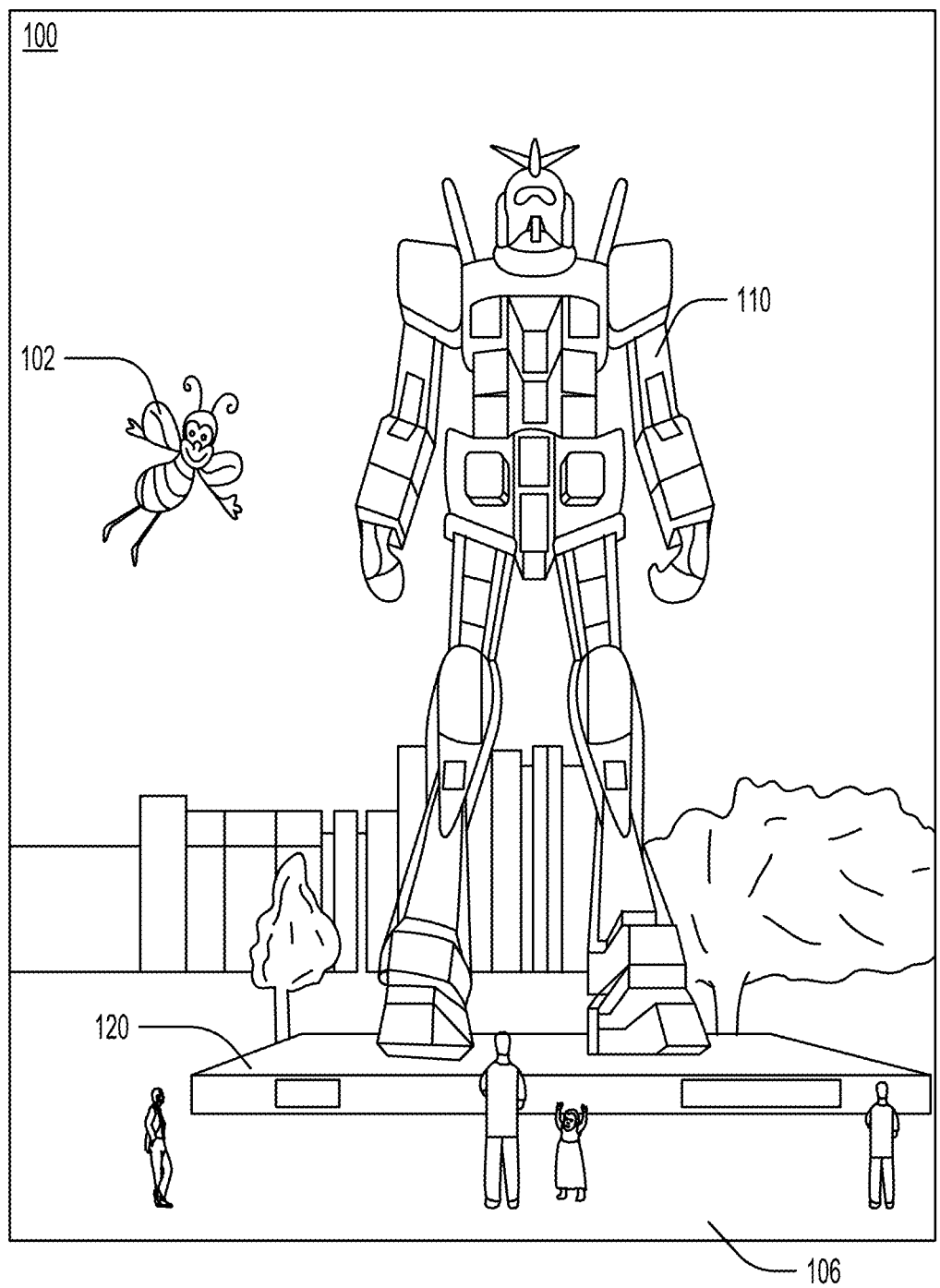
FIG. 1 illustrates an augmented reality (AR) scene as viewed through a wearable AR device, according to some embodiments of the present invention.

Efficient, accurate, and real-time depth estimation is useful for a wide variety of scene understanding applications in domains such as virtual reality (VR), augmented reality (AR), mixed reality (MR), self-driving cars, unmanned aerial vehicles, gaming systems, and robotics. One currently available consumer-grade depth sensor consumes approximately 15 W of power, has a limited range of approximately 4.5 m, works only indoors, and has a performance that is affected by increased ambient light. A future VR/MR head-mounted depth camera would preferably be small, consume $\frac{1}{100}$th the amount of power, and have a range at least between 1-80 m (indoors and outdoors) with a field-of-view and resolution matching that of an RGB camera. Accordingly, there is a need for novel energy efficient depth hardware and depth estimation models.

Depth estimation from a single monocular RGB image is a problem that has been ubiquitous in the computer vision community, but is an ill-defined problem due to its intrinsic scale ambiguity. It is then perhaps not surprising that the state-of-the-art depth estimation models still all produce >12% relative (to true depth) error on the popular NYUv2 indoor dataset. Such errors are too high for robust use in applications such as three-dimensional (3D) reconstruction for MR/AR and/or city navigation for autonomous driving. Conventional depth sensors have a relative depth error on the order of ~1% indoors (where error is defined as temporal jitter), suggesting that deep monocular depth estimation is still quite far away from matching the performance of such sensors.

Given the limitations of monocular depth estimation, the present invention provides a model that utilizes a small amount of depth input. This could, for example, be obtained from a specifically designed sparse, energy efficient sensor or by sparsifying the dense illumination pattern in time-of-flight sensors. For outdoor scenes, this could come from confident stereo matches or a LiDAR like device. Having access to sparse depth readings immediately resolves the scale ambiguity in depth estimation, and it will be described that the deep network can provide comparable performance to a full depth sensor despite only having access to a small fraction of the depth map. One objective of the present invention is thus to densify a sparse depth map, in conjunction with a registered RGB or grayscale image.

One advantage of the dense depth prediction model according to the present invention is that it accommodates for any possible sampling pattern for the sparse depth input, each of which may correspond to a relevant physical scenario. A regular grid sampling pattern makes the problem equivalent to that of depth super-resolution, with sparse depth maps potentially coming from an efficient depth sensor. A sampling pattern corresponding to certain interest point distributions such as ORB or SIFT would make the model a plausible element within SLAM systems that provide sparse depth at interest point locations. Some embodiments of the present disclosure may focus on regular grid patterns due to their ease of interpretation and immediate relevance to existing depth sensor hardware, but regular grid patterns are not required.

FIG. 1 illustrates an AR scene as viewed through a wearable AR device, according to some embodiments of the present invention. An AR scene 100 is depicted wherein a user of an AR technology sees a real-world park-like setting 106 featuring people, trees, buildings in the background, and a concrete platform 120. In addition to these items, the user of the AR technology also perceives that he "sees" a robot statue 110 standing upon the real-world platform 120, and a cartoon-like avatar character 102 flying by, which seems to be a personification of a bumble bee, even though these elements (character 102 and statue 110) do not exist in the real world. Due to the extreme complexity of the human visual perception and nervous system, it is challenging to produce a VR or AR technology that facilitates a comfortable, natural-feeling, rich presentation of virtual image elements amongst other virtual or real-world imagery elements.

Figure 2:
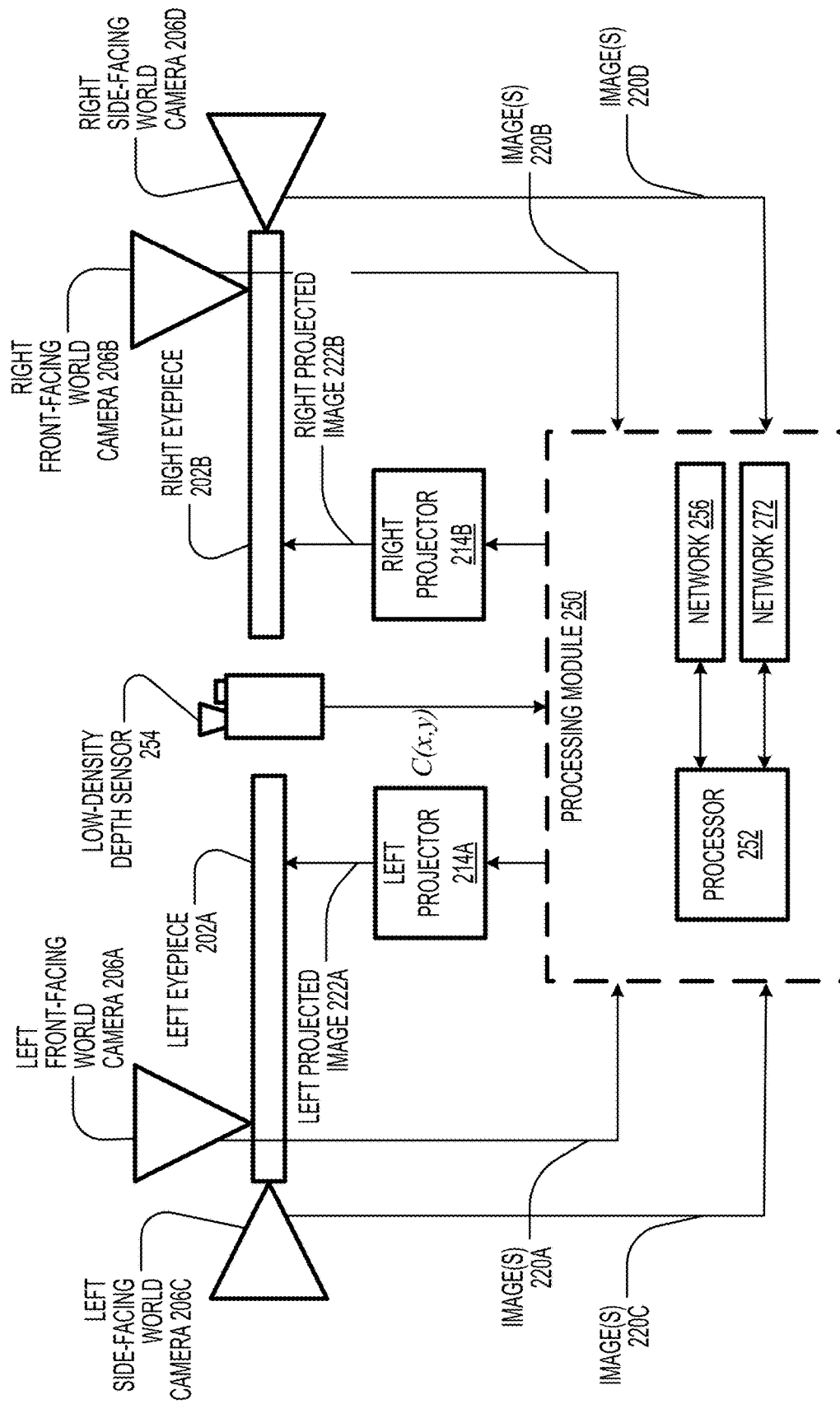
FIG. 2 illustrates a schematic view of a wearable AR device, according to some embodiments of the present invention.

FIG. 2 illustrates a schematic view of a wearable AR device 200, according to some embodiments of the present invention. AR device 200 may include a variety of components including a left eyepiece 202A, a right eyepiece 202B, a left front-facing world camera 206A attached directly on or near left eyepiece 202A, a right front-facing world camera 202B attached directly on or near right eyepiece 202B, a left side-facing world camera 206C, a right side-facing world camera 206D, a left projector optically linked to left eyepiece 202A, a right projector optically linked to right eyepiece 202B, and a processing module 250. Some or all of the components of AR device 200 may be head mounted such that projected images may be viewed by a user. In one particular implementation, all of the components of AR device 200 shown in FIG. 2 are mounted onto a single device (e.g., a single headset) wearable by a user. In another implementation, processing module 250 is physically separate from and communicatively coupled to the other components of AR device 200 via wired or wireless connections. For example, processing module 250 may be mounted in a variety of configurations, such as fixedly attached to a frame, fixedly attached to a helmet or hat worn by a user, embedded in headphones, or otherwise removably attached to a user (e.g., in a backpack-style configuration, in a belt-coupling style configuration, etc.).

Processing module 250 may comprise a processor 252, as well as digital memory, such as non-volatile memory (e.g., flash memory), both of which may be utilized to assist in the processing, caching, and storage of data. The data may include data captured from sensors (which may be, e.g., operatively coupled to AR device 200) or otherwise attached to a user, such as image capture devices (e.g., cameras 206), a low-density depth sensor 254, microphones, inertial measurement units, accelerometers, compasses, GPS units, radio devices, and/or gyros. For example, processing module 250 may receive image(s) 220 from cameras 206, or specifically, left front image(s) 220A from left front-facing world camera 206A, right front image(s) 220B from right front-facing world camera 206B, left side image(s) 220C from left side-facing world camera 206C, and right side image(s) 220D from right side-facing world camera 206D. In some embodiments, image(s) 220 may include a single image, a pair of images, a video comprising a stream of images, a video comprising a stream of paired images, and the like. Image(s) 220 may be periodically generated and sent to processing module 250 while AR device 200 is powered on, or may be generated in response to an instruction sent by processing module 250 to one or more of the cameras. As another example, processing module 250 may receive a low-density depth map $C(x,y)$ from low-density depth sensor 254.

Eyepieces 202A, 202B may comprise transparent or semi-transparent waveguides configured to direct light from projectors 214A, 214B, respectively. Specifically, processing module 250 may cause left projector 214A to output a left projected image 222A onto left eyepiece 202A, and may cause right projector 214B to output a right projected image 222B into right eyepiece 202B. In some embodiments, each of eyepieces 202A, 202B may comprise a plurality of waveguides corresponding to different colors and/or different depth planes.

Cameras 206A, 206B may be positioned so as to capture images that substantially overlap with the field of view of a user's left and right eyes, respectively. Accordingly, placement of cameras 206A, 206B may be near a user's eyes but not so near as to obscure the user's field of view. Alternatively or additionally, cameras 206A, 206B may be positioned so as to align with the incoupling locations of projected images 222A, 222B, respectively. Cameras 206C, 206D may be positioned to capture images to the side of a user, e.g., in a user's peripheral vision or outside the user's peripheral vision. Image(s) 220C, 220D captured using cameras 206C, 206D may or may not partially overlap with image(s) 220A, 220B captured using cameras 206A, 206B.

During operation of AR device 200, processing module 250 may use one or more trained neural networks (such as neural network 256, 272) to compute depth maps of a scene (within the field of view of AR device 200) based on low-density depth maps generated by low-density depth sensor 254 in combination with one or more of images 220. Networks 256, 272 may be artificial neural networks, convolutional neural networks, deep networks, or any type of networks or systems that can "learn" progressively by processing examples. In some embodiments, networks 256, 272 comprise a collection of connected nodes that are capable of relaying data from one to another. Networks 256, 272 may be stored within processing module as compiled code. The training and usage of networks 256, 272 is described in further detail below.

Figure 3:
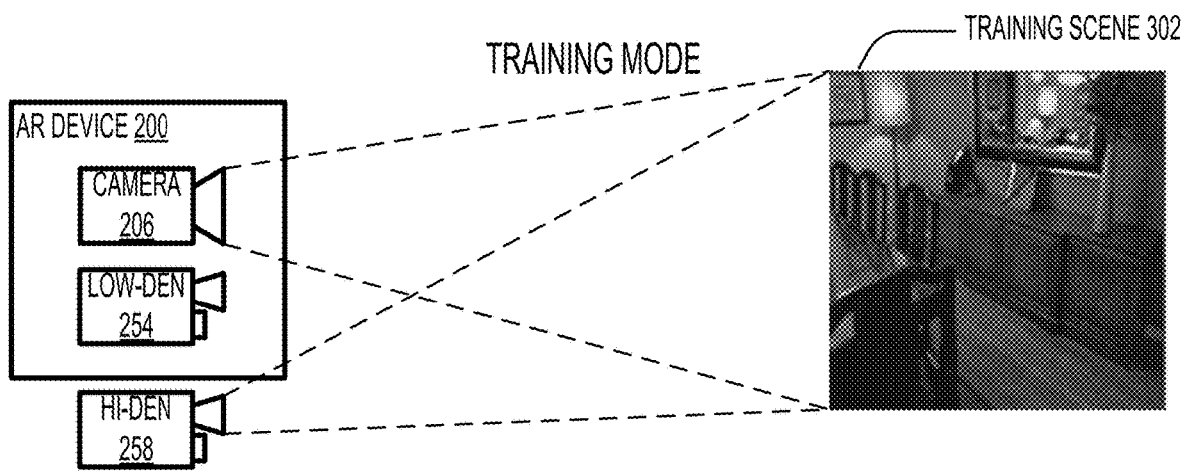
FIG. 3 illustrates a device setup for a training mode of an AR device, according to some embodiments of the present invention.

FIG. 3 illustrates a device setup for a training mode of AR device 200 (i.e., a training mode of one or both of networks 256, 272), according to some embodiments of the present invention. When AR device 200 is operating in a training mode, a high-density depth sensor 258 may be positioned within or near AR device 200 so that a field of view of high-density depth sensor 258 corresponds to the field of view of camera 206. During a training mode, networks 256, 272 are trained using a high-density depth map $D(x,y)$ of a training scene 302 generated using high-density depth sensor 258 and a camera image $I(x,y,c)$ of training scene 302 captured/generated by camera 260. Low-density depth sensor 254 may be unpowered, removed, and/or ignored during training mode. In some embodiments, high-density depth sensor 258 is temporarily attached to the front of AR device 200 during training. In some embodiments, each of camera 206 and high-density depth sensor 258 are sequentially positioned at predetermined locations such that the field of views of the devices may be closely aligned. In some embodiments, training may be performed using pre-generated images and depth maps such that the various hardware components of AR device 200 need not be operating during training.

Figure 4:
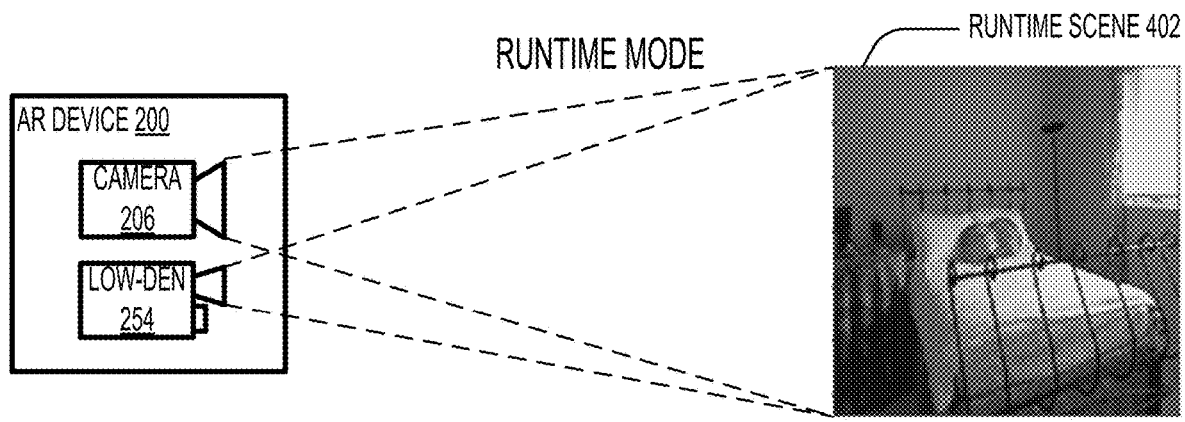
FIG. 4 illustrates a device setup for a runtime mode of an AR device, according to some embodiments of the present invention.

FIG. 4 illustrates a device setup for a runtime mode of AR device 200 (i.e., a runtime mode of one or both of neural networks 256, 272), according to some embodiments of the present invention. During a runtime mode, high-density depth sensor 258 is removed (and/or is left unpowered or is modified for low-density depth sensing) and networks 256, 272 are used to generate a computed depth map $\hat{D}(x,y)$ based on a low-density depth map $C(x,y)$ of runtime scene 402 captured by low-density depth sensor 254 and a camera image $I(x,y,c)$ of runtime scene 402 captured by camera 206. In some embodiments, the accuracy of the computed depth map $\hat{D}(x,y)$ is improved when training scene 302 and runtime scene 402 are similar. That is, runtime performance is improved when the training images are representative of the runtime images. For example, both scenes may be inside or outside, and may have similar lighting, textures, and distribution of items within the scene.

Figure 5A:
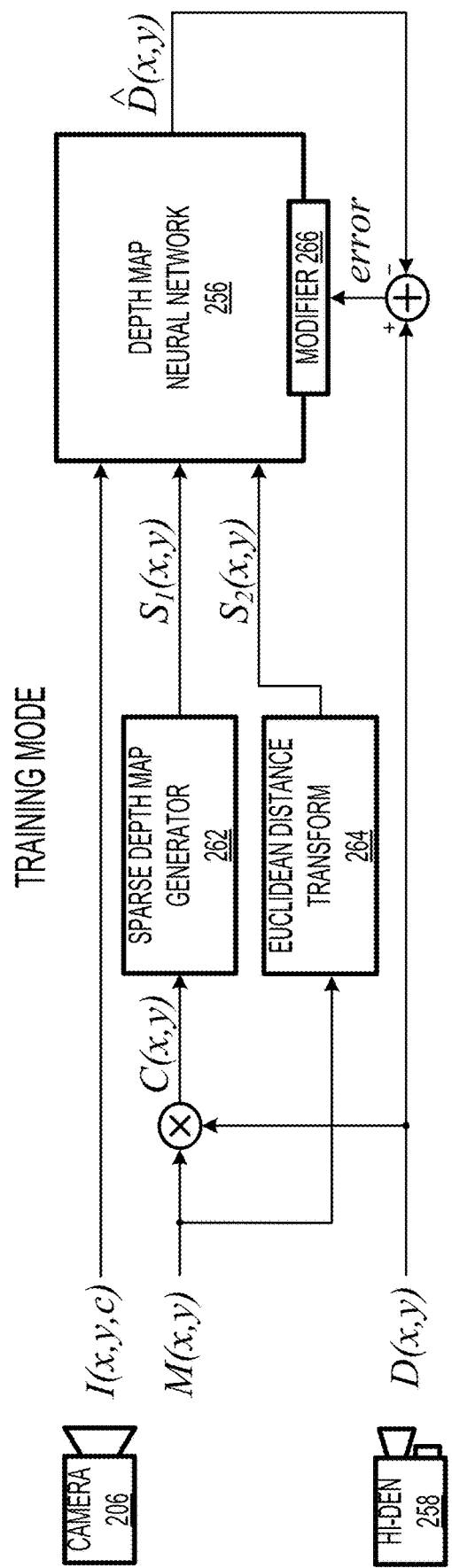
Figure 5C:
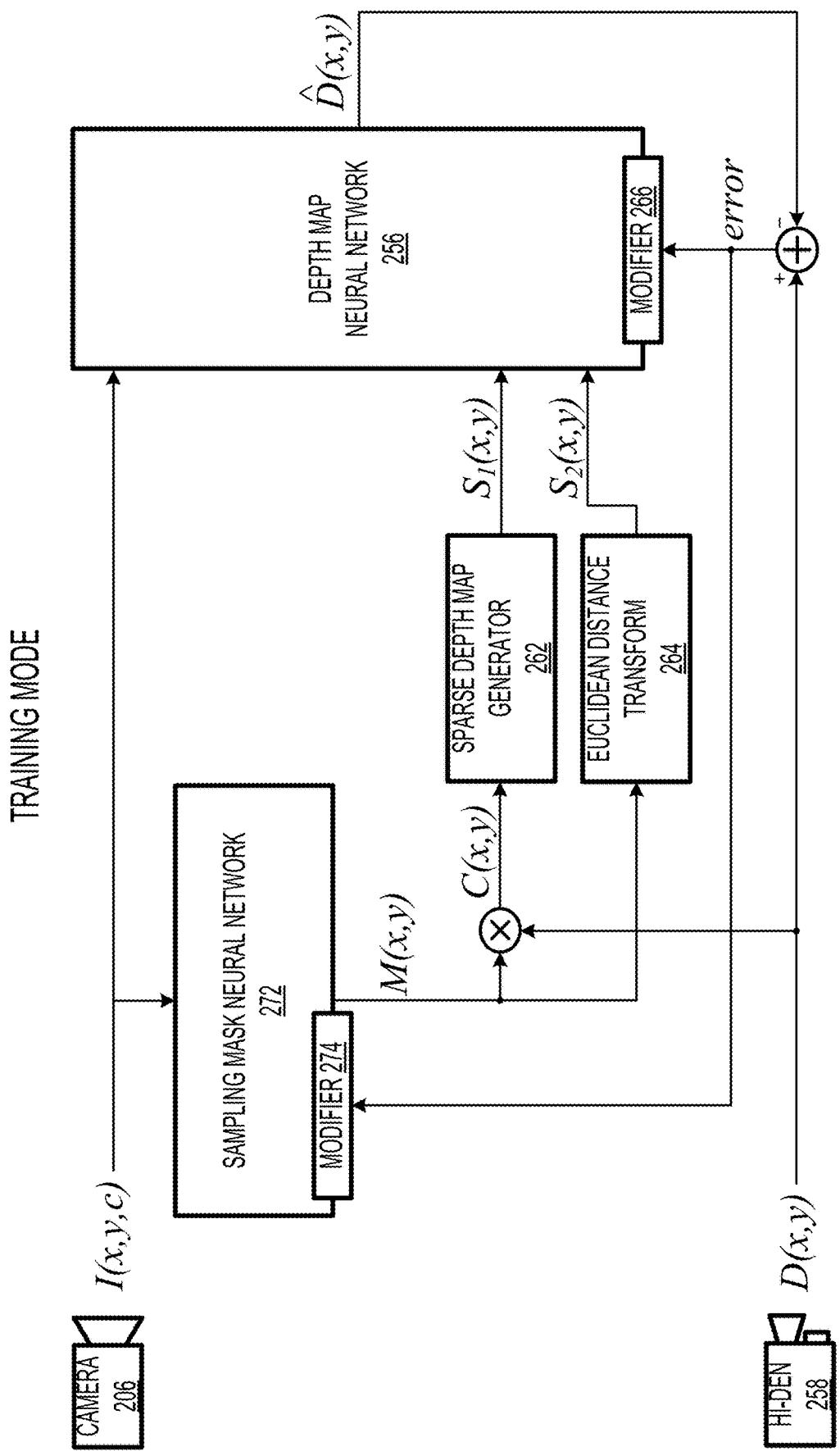

FIGS. 5A, 5B, and 5C illustrate schematic views of various training modes of AR device 200. FIG. 5A illustrates a first training mode in which a depth map neural network 256 is trained. In some instances, three inputs may be provided at each training step: the camera image $I(x,y,c)$ having dimensions of H×W×C, a binary sampling mask $M(x,y)$ having dimensions of H×W (alternatively referred to herein as the sampling mask), and the high-density depth map $D(x,y)$ having dimensions of H×W (alternatively referred to herein as the ground truth depth map). Variable C is the number of channels for the camera image $I(x,y,c)$ and is equal to 3 for RGB images and 1 for grayscale images. If a particular pixel $(x,y)$ of $D(x,y)$ has an invalid or missing depth value, then the depth value may be set to 0 or infinity.

In some embodiments, the binary sampling mask $M(x,y)$ is set equal to 1 for the points $(x,y)$ that are being sampled from $D(x,y)$. These points may collectively be referred herein as the plurality of sampling points. The remaining values of the binary sampling mask M(x,y) may be set equal to 0. The result of sampling the high-density depth map D(x,y) using the sampling mask M(x,y) is the low-density depth map C(x,y), also having dimensions of H×W. This is illustrated in FIG. 5A using a multiplication operation (e.g., an element-by-element multiplication between the matrices D(x,y) and M(x,y)). For the present model, it is assumed that the low-density depth map C(x,y) obtained by sampling D(x,y) using M(x,y) is identical or substantially similar to the low-density depth map C(x,y) generated by low-density depth sensor 254.

The inputs to network 256 include the camera image I(x,y,c), a sparse depth map $S_1(x,y)$ having dimensions of H×W, and a distance map $S_2(x,y)$ having dimensions of H×W. The sparse depth map $S_1(x,y)$ is generated from the low-density depth map C(x,y) by filling in C(x,y) with the depth value of the nearest neighbor. In other words, for each of the plurality of sampling points (as originally defined by points (x,y) of M(x,y) having a value equal to 1), the value of $S_1(x,y)$ is set equal to the value of C(x,y) (as originally defined by D(x,y)) and, for each of the remaining points, the value of $S_1(x,y)$ is set equal to the value of C(x,y) of the nearest sampling point (as originally defined by D(x,y)). In some embodiments, the transformation from C(x,y) to $S_1(x,y)$ may be performed by a sparse depth map generator 262. In some embodiments, $S_1(x,y)$ may be computed directly from M(x,y) and D(x,y) without computing C(x,y).

The distance map $S_2(x,y)$ is generated from the sampling mask M(x,y) by computing the Euclidean distance transform of M(x,y). This includes setting the value of $S_2(x,y)$ to the Euclidean distance between (x,y) and the closest point (x',y') where M(x',y') is equal to 1, assuming that M(x,y) has been corrected to only sample from valid depth points. In other words, for each of the plurality of sampling points (as originally defined by points (x,y) of M(x,y) having a value equal to 1), the value of $S_2(x,y)$ is set equal to 0 (as the Euclidean distance between a point and itself is 0) and, for each of the remaining points, the value of $S_2(x,y)$ is set equal to the Euclidean distance between (x,y) and the nearest sampling point (x',y'). In some embodiments, the transformation from M(x,y) to $S_2(x,y)$ may be performed by a Euclidean distance transform 264. In some embodiments, $S_2(x,y)$ may be computed from C(x,y) instead of M(x,y) (since M(x,y) can be recreated from C(x,y)).

After network 256 is provided with the camera image I(x,y,c), the sparse depth map $S_1(x,y)$, and the distance map $S_2(x,y)$, network 256 may generate a computed depth map $\hat{D}(x,y)$. The computed depth map $\hat{D}(x,y)$ may be compared to the high-density depth map D(x,y) to calculate an estimation error (i.e., error). The error may be a single value or may be a matrix having dimensions of H×W that is computed as the element-by-element difference between the matrices $\hat{D}(x,y)$ and D(x,y). Network 256 may then be modified (using, e.g., modifier 266) based on the calculated error between the computed depth map $\hat{D}(x,y)$ and the high-density depth map D(x,y). The magnitude of the modification to network 256 may be proportional to the magnitude of the error, such that larger errors cause larger modifications to network 256. In some embodiments, network 256 is modified such that a subsequent output of the computed depth map $\hat{D}(x,y)$ using the same inputs produces a smaller error (i.e., $\hat{D}(x,y)$ becomes a better prediction for D(x,y)). A number of training steps N, which is equal to the number of computations of $\hat{D}(x,y)$ and/or modifications to network 256, may be predetermined or, alternatively, N may be variable such that training steps are performed until the error drops below a threshold and/or the error converges to a value.

In some embodiments, network 256 may alternatively output the error directly in place of the computed depth map $\hat{D}(x,y)$. In this implementation, the error is immediately available for training purposes and the computed depth map $\hat{D}(x,y)$, although not necessarily needed during training, may be obtained by adding the error to or subtracting the error from the high-density depth map D(x,y), depending on the method of calculating the error. Because the computed depth map $\hat{D}(x,y)$ is readily available from and implicit in the error, in such embodiments calculating error may be understood as calculating the computed depth map $\hat{D}(x,y)$.

FIG. 5B illustrates a second training mode in which a sampling mask neural network 272 is trained. In some instances, two inputs may be provided at each training step: the camera image I(x,y,c) and the high-density depth map D(x,y). The camera image I(x,y,c) is provided as input to sampling mask neural network 272. In response to the camera image I(x,y,c) being provided as input, network 272 may analyze the camera image I(x,y,c) and may generate the sampling mask M(x,y) based on the analysis. The generated sampling mask M(x,y) may include a plurality of target sampling points at which the depth of the training scene is to be determined. The remaining values of the sampling mask M(x,y) may be set equal to 0. The result of sampling the high-density depth map D(x,y) using the sampling mask M(x,y) is the low-density depth map C(x,y), which may be performed by an element-by-element multiplication between the matrices D(x,y) and M(x,y).

The inputs to network 256 include the camera image I(x,y,c), the sparse depth map $S_1(x,y)$ (the computation of which is described in reference to FIG. 5A), and the distance map $S_2(x,y)$ (the computation of which is described in reference to FIG. 5A). After network 256 is provided with the camera image I(x,y,c), the sparse depth map $S_1(x,y)$, and the distance map $S_2(x,y)$, network 256 may generate the computed depth map $\hat{D}(x,y)$, which may be compared to the high-density depth map D(x,y) to calculate the estimation error (i.e., error). Network 272 may then be modified (using, e.g., modifier 274) based on the calculated error. The magnitude of the modification to network 272 may be proportional to the magnitude of the error, such that larger errors cause larger modifications to network 272. In some embodiments, network 272 is modified such that a subsequent output of the computed depth map $\hat{D}(x,y)$ using the same inputs produces a smaller error (i.e., $\hat{D}(x,y)$ becomes a better prediction for D(x,y)). A number of training steps N, which is equal to the number of computations of $\hat{D}(x,y)$ and/or modifications to network 272, may be predetermined or, alternatively, N may be variable such that training steps are performed until the error drops below a threshold and/or the error converges to a value.

In this manner, network 272 "learns" which pixels of the camera image I(x,y,c) should be sampled for depth measurements such that the computed depth map $\hat{D}(x,y)$ better approximates the high-density depth map D(x,y). In some instances, network 272 may analyze the camera image I(x,y,c) and detect one or more interest points within the camera image I(x,y,c), and the plurality of target sampling points may be based on the detected interest points. For example, in some embodiments interest points may be detected at edges (points where a boundary exists between two image regions), at corners (points where an edge has a rapidly changing direction, or at blobs (points where an image region has some properties, for example color, that are approximately constant). Network 272 may "learn" where to place the plurality of target sampling points based the interest points. For example, target sampling points may be placed at or near one or more interest points or in between interest points. As another example, target sampling points may be placed at or near midpoints between different pairs of interest points. As another example, target sampling points may be placed at or near image regions having higher concentrations of interest points.

FIG. 5C illustrates a third training mode in which depth map neural network 256 and sampling mask neural network 272 are each trained during each training step. For example, during each training step of the third training mode, the sampling mask M(x,y) may be generated by network 272, the computed depth map $\hat{D}(x,y)$ may be generated by network 256, the estimation error (i.e., error) may be calculated based on a comparison between the computed depth map $\hat{D}(x,y)$ and the high-density depth map D(x,y), and each of networks 256, 272 may be modified based on the estimation error (as described in reference to FIGS. 5A and 5B). In some embodiments, networks 256, 272 may be trained (i.e., modified) separately during some training steps and concurrently during other training steps. In one example, of N total training steps, network 256 may be trained during N/2 training steps and network 272 may be trained during the other N/2 training steps. Training steps may alternate between networks 256, 272 between each training step or several training steps may be performed for each network before alternating to the other network. In another example, network 256 may be trained during N/3 training steps, network 272 may be trained during N/3 training steps, and both networks 256, 272 may be trained during N/3 training steps. Other possibilities are contemplated.

Figure 6A:
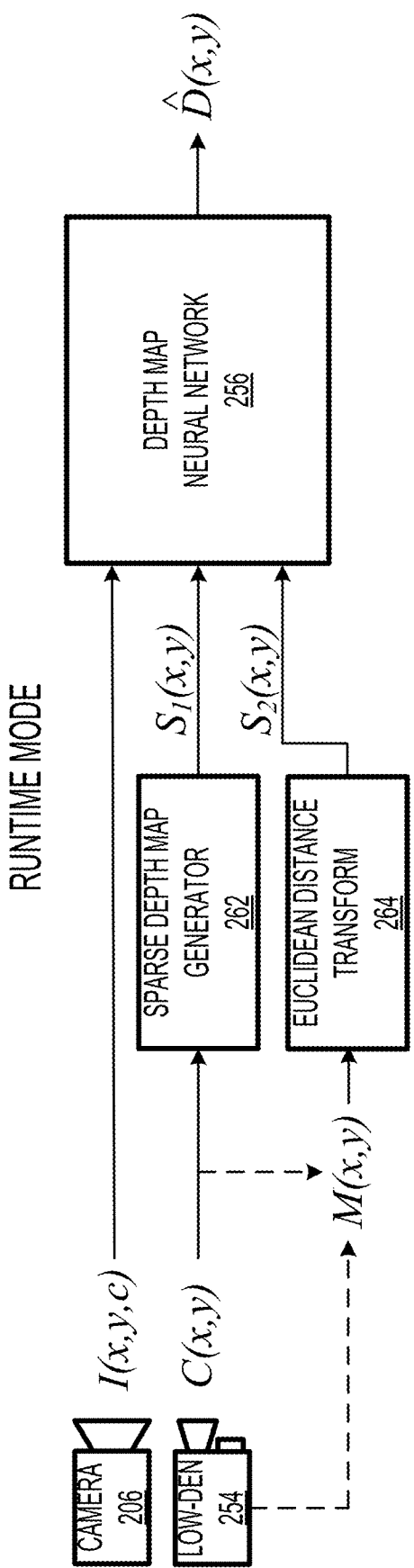
FIGS. 6A and 6B illustrate schematic views of various runtime modes of an AR device.
Figure 6B:
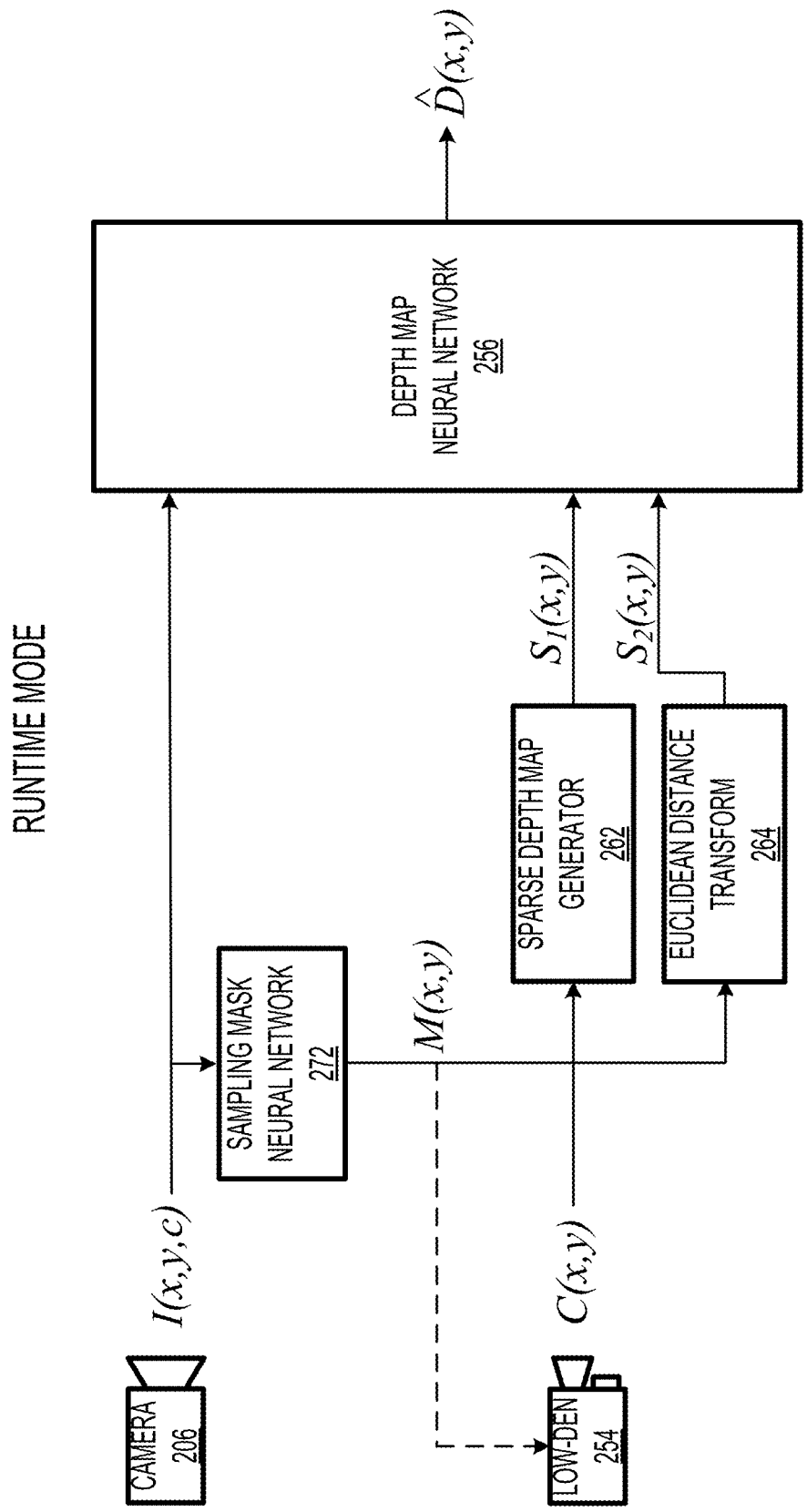

FIGS. 6A and 6B illustrate schematic views of various runtime modes of AR device 200. FIG. 6A illustrates a first runtime mode in which the computed depth map $\hat{D}(x,y)$ is generated based on the camera image I(x,y,c) and the low-density depth map C(x,y) captured of a runtime scene, and the sampling mask M(x,y) is determined independent of the camera image I(x,y,c). The first runtime mode may be initiated to facilitate performance of AR device 200 at regular or irregular intervals. For example, each time the computed depth map $\hat{D}(x,y)$ is requested, or at predetermined intervals, camera 206 captures the camera image I(x,y,c), low-density depth sensor 254 captures the low-density depth map C(x,y), and sampling mask M(x,y) is determined based on a setting of low-density depth sensor 254 or by analysis of C(x,y) (as indicated by the dashed lines). The sampling mask M(x,y) may be determined by, for example, determining pixel locations at which depth measurements are captured (i.e., pixel locations at which the low-density depth map C(x,y) contains non-zero values). The sparse depth map $S_1(x,y)$ and the distance map $S_2(x,y)$ may then generated based on C(x,y) and M(x,y), respectively, as described above. The computed depth map $\hat{D}(x,y)$ is then generated by network 256 based on the camera image I(x,y,c), the sparse depth map $S_1(x,y)$, and the distance map $S_2(x,y)$, and is sent to processor 252, which incorporates $\hat{D}(x,y)$ into the generation of projected images 222A, 222B.

FIG. 6B illustrates a second runtime mode in which the computed depth map $\hat{D}(x,y)$ is generated based on the camera image I(x,y,c) and the low-density depth map C(x,y) captured of a runtime scene, and the sampling mask M(x,y) is determined based on the camera image I(x,y,c). The sampling mask M(x,y) is used to adjust a setting associated with low-density depth sensor 254 such that low-density depth sensor 254 captures depth measurements in accordance with the sampling mask M(x,y). The second runtime mode may be initiated to facilitate performance of AR device 200 at regular or irregular intervals. For example, each time the computed depth map $\hat{D}(x,y)$ is requested, or at predetermined intervals, camera 206 captures the camera image I(x,y,c), low-density depth sensor 254 captures the low-density depth map C(x,y), and the sampling mask M(x,y) is determined based on the camera image I(x,y,c). The sparse depth map $S_1(x,y)$ and the distance map $S_2(x,y)$ may then generated based on C(x,y) and M(x,y), respectively, as described above. The computed depth map $\hat{D}(x,y)$ is then generated by network 256 based on the camera image I(x,y,c), the sparse depth map $S_1(x,y)$, and the distance map $S_2(x,y)$, and is sent to processor 252, which incorporates $\hat{D}(x,y)$ into the generation of projected images 222A, 222B.

Embodiments of the present invention provide innovation in how the sparse inputs are parameterized for network 256. Unlike depth super-resolution approaches, which lock the number of samples and the sampling pattern (necessarily a grid-like pattern) before the start of training, embodiments herein search for a parametrization that can accommodate any arbitrary sampling pattern on the high-density depth map and can sample a variable number of points for each training step. Such a method enables a variety of different sampling strategies to be explored, not just across different models, but even within the same training run, which improves model performance. It should be noted that, to accommodate any sampling pattern, the sparse depth input may be the same resolution as the ground truth depth map.

Another benefit of the present invention is that the parametrization is fast in comparison to conventional approaches, with at most two Euclidean transforms involved with calculating the final sparse inputs ($S_1(x,y)$ and $S_2(x,y)$). Another benefit is that the input sparse map may not contain zeros (as opposed to sparse parametrizations like in some conventional approaches), which then enables the densification problem to be treated as a residual prediction on top of the sparse map. However, one potential issue with reducing the problem to a residual prediction is that the model loses all a priori knowledge of which pixel locations corresponded to the sampling locations where M(x,y) is equal to 1. The distance map $S_2(x,y)$ gives the model a smooth way to recover M(x,y), thus allowing the sparse depth map $S_1(x,y)$ to be inverted should the model choose.

Another advantage of the present invention is that the sampling pattern can be varied, not just across different models, but within the same model during training. For example, a slow decay learning schedule can be employed following the rule $N_{samples}(t)=[5Ne^{-0.0003t}+N]$ for training step t, which begins training at six times the desired sampling density N and smoothly decays towards the desired final sampling density N as training progresses. This dynamic sampling strategy was demonstrated to boost network performance.

Figure 7:
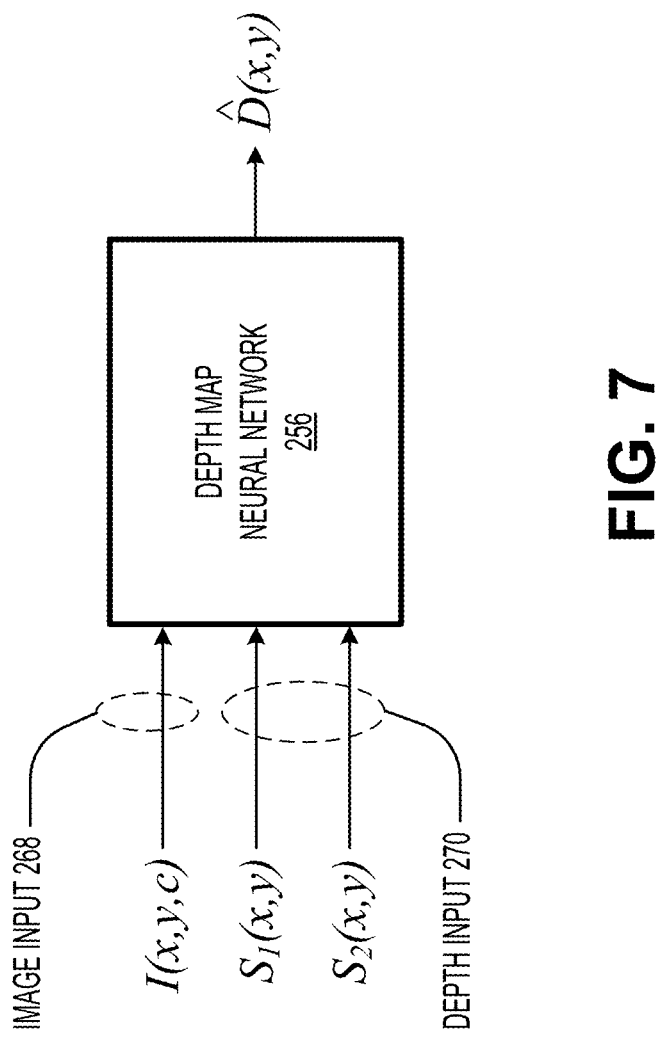
FIG. 7 illustrates a schematic view of a characterization of the inputs to a neural network, according to some embodiments of the present invention.

FIG. 7 illustrates a schematic view of a characterization of the inputs to network 256, according to some embodiments of the present invention. As shown in FIG. 7, the camera image I(x,y,c) may be characterized as an image input 268, and the sparse depth map $S_1(x,y)$ and the distance map $S_2(x,y)$ may be characterized as a depth input 270. Accordingly, in some embodiments network 256 may be provided with two inputs including image input 268 and depth input 270. Depth input 270 may include one or more of C(x,y), M(x,y), $S_1(x,y)$, and $S_2(x,y)$. In some embodiments, depth input 270 includes a concatenation of $S_1(x,y)$ and $S_2(x,y)$ having dimensions of H×W×2. In some embodiments, image input 268 and depth input 270 may be combined such that an input comprising a concatenation of I(x,y,c), $S_1(x,y)$, and $S_2(x,y)$ having dimensions of H×W×(C+2) may be used. In some embodiments, depth input 270 is alternatively referred to as the sparse input.

Figure 8:
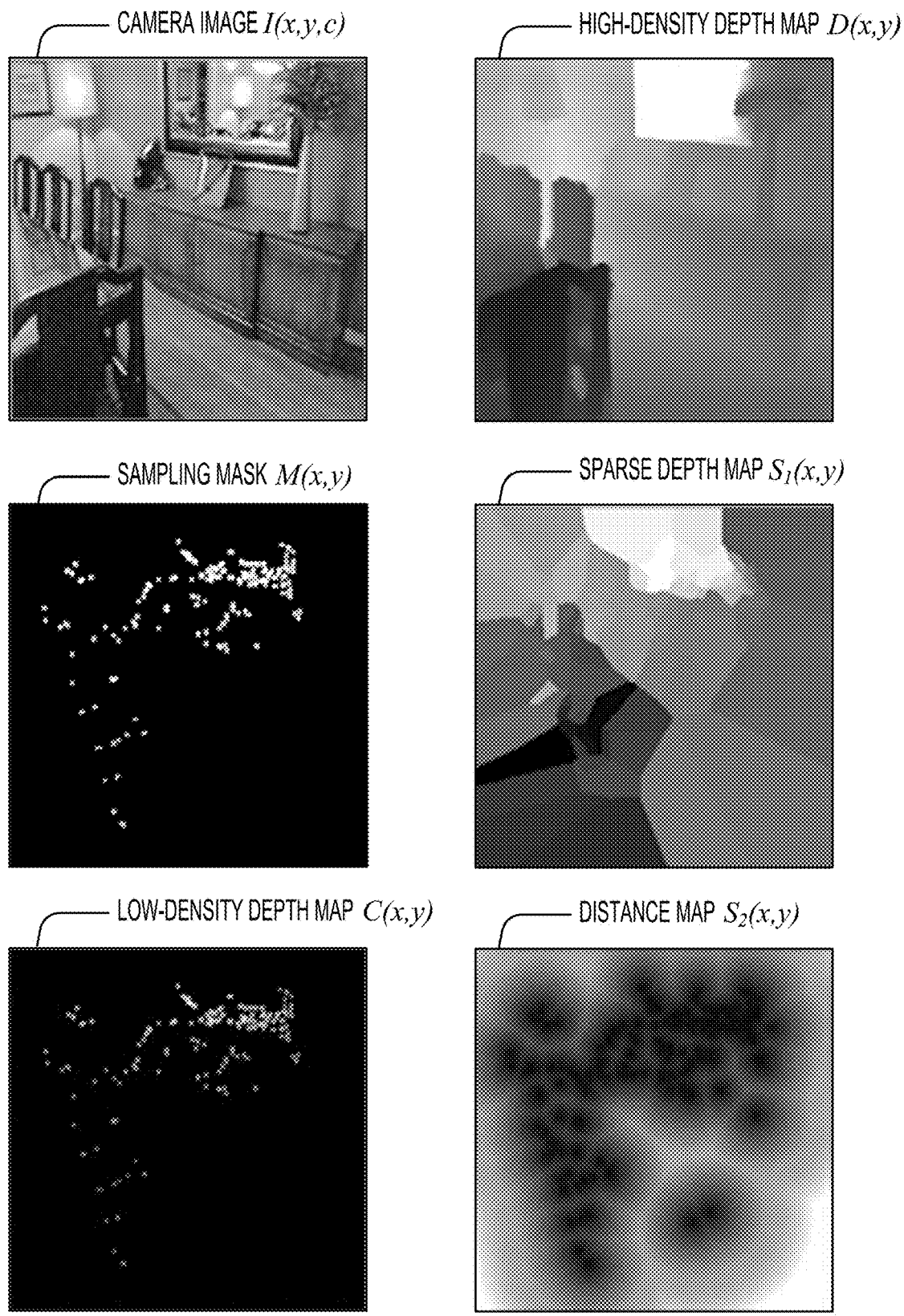
FIG. 8 illustrates examples of the various images, maps, and masks that may be captured/generated during training mode or runtime mode of an AR device.

FIG. 8 illustrates examples of the various images, maps, and masks that may be captured/generated during a training mode or a runtime mode of AR device 200. As illustrated by the non-zero values of sampling mask M(x,y), the sampling points are irregular, not conforming to a grid. In some embodiments, depth map accuracy is improved by sampling areas with higher concentrations of interested points with more samples than areas with fewer interest points. For example, in some embodiments the camera image I(x,y,c) may be first analyzed to determine locations of interest points. Locations of sample points may subsequently be determined to coincide with the locations of the interest points. In the illustrated embodiment, the brightness of each pixel may correspond to the value of the pixel. For example, the values of distance map $S_2(x,y)$ are proportional to brightness such that lighter pixels correspond to greater Euclidean distances.

Figure 9:
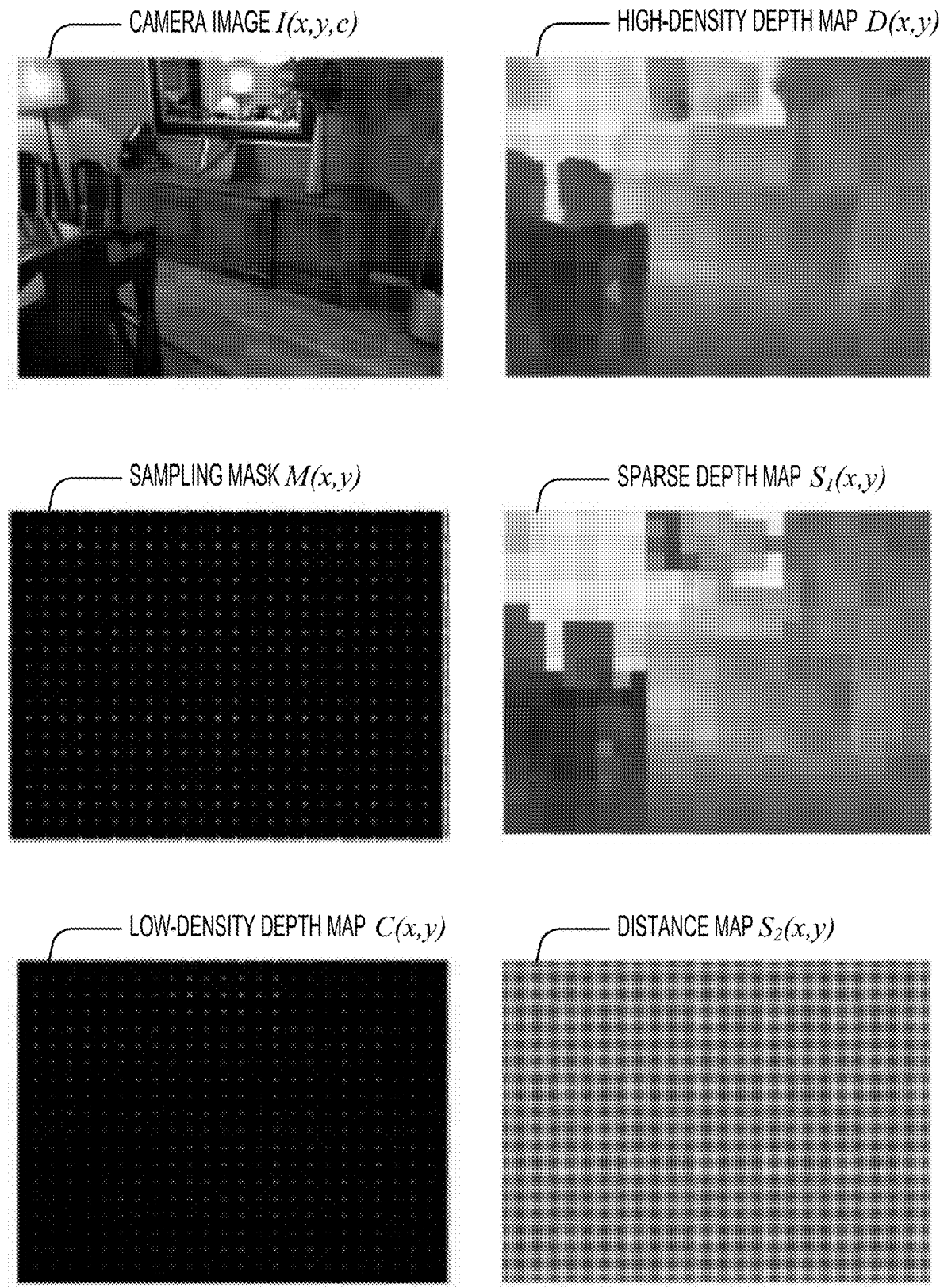
FIG. 9 illustrates examples of the various images, maps, and masks that may be captured/generated during training mode or runtime mode of an AR device.

FIG. 9 illustrates examples of the various images, maps, and masks that may be captured/generated during a training mode or a runtime mode of AR device 200. Some of the items shown in FIG. 9 differ from those shown in FIG. 8 due to the sampling points (as illustrated by the non-zero values of sampling mask M(x,y)) being grid-like. In the illustrated embodiment, the brightness of each pixel may correspond to the value of the pixel.

FIGS. 10A-10D illustrate examples of various depth sensors 1054 that may be adjusted to capture depth measurements at target sampling points as indicated in the sampling mask M(x,y). Each of depth sensors 1054 may correspond to low-density depth sensor 254, as described herein. Each of depth sensors 1054 may employ various technologies that utilize the transmission and reception of signals, such as light, electromagnetic, acoustic, among other possibilities. A setting of each of depth sensors 1054 may be considered to be adjusted when either of control signals 1014, 1016 are modified.

Figure 10A:
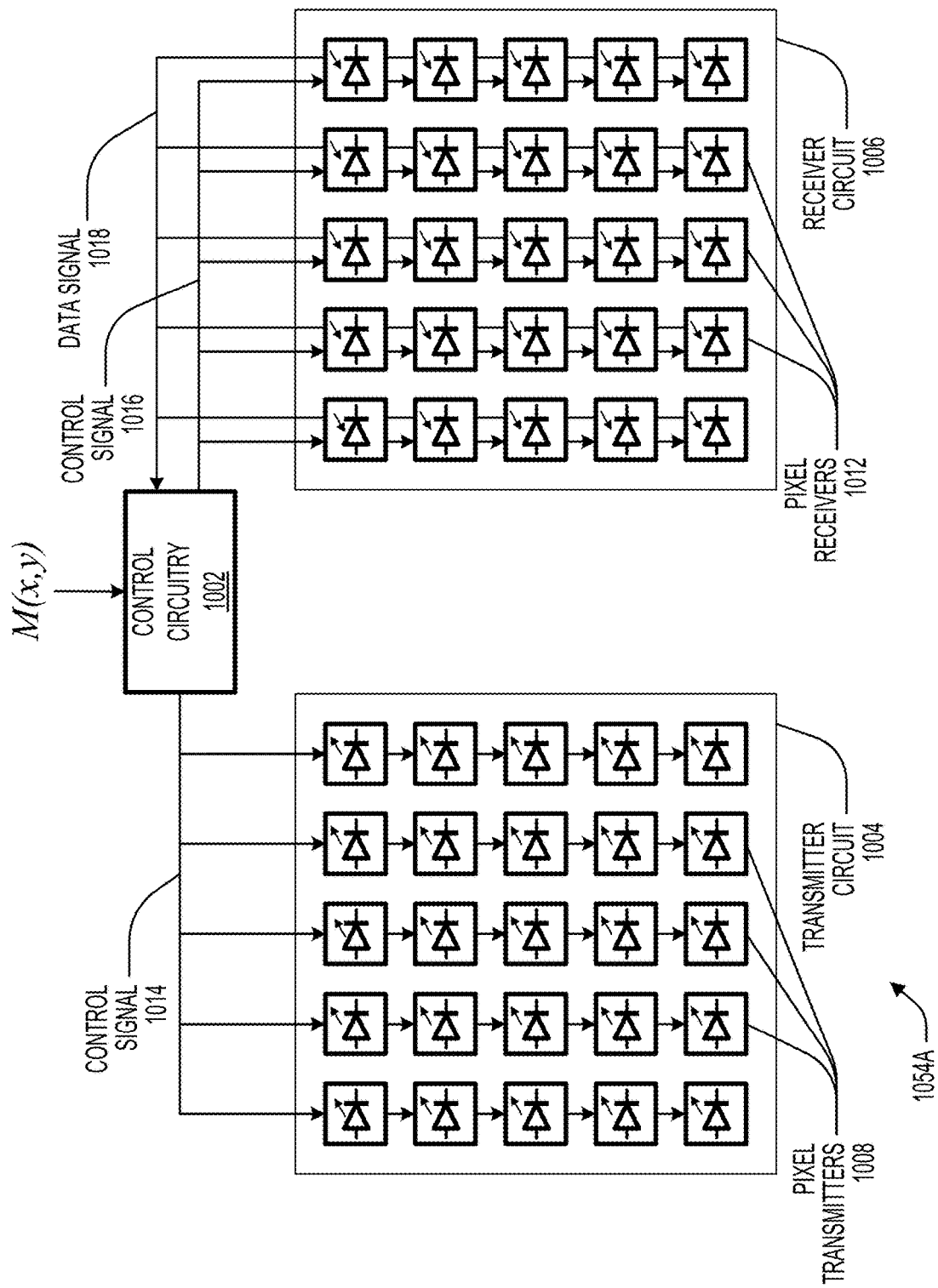
FIGS. 10A-10D illustrate examples of various depth sensors that may be adjusted to capture depth measurements at target sampling points.

Referring to FIG. 10A, a depth sensor 1054A is illustrated having a control circuit 1002 communicatively coupled to a transmitter circuit 1004 and a receiver circuit 1006. Transmitter circuit 1004 includes a plurality of pixel transmitters 1008 arranged in a grid comprising multiple rows and columns. Each of pixel transmitters 1008 may be powered or unpowered based on a control signal 1014 and, when powered, may transmit a signal toward a target sampling point in a scene in a directed or undirected manner. For example, control circuitry 1002 may cause one or more of pixel transmitters 1008 to steer a transmitted signal toward a target sampling point. In one example, control circuitry 1002 may cause a first subset of pixel transmitters 1008 to be powered and a second subset of pixel transmitters 1008 to be unpowered. The first subset of pixel transmitters 1008 may transmit signals in a default direction or may be steered toward specific target sampling points. In another example, control circuitry 1002 may cause all of pixel transmitters 1008 to be powered on and may cause the transmitted signals to be steered toward target sampling points. Pixel transmitters 1008 may be powered on and/or steered simultaneously, concurrently, and/or sequentially.

Receiver circuit 1006 includes a plurality of pixel receivers 1012 arranged in a grid comprising multiple rows and columns. Each of pixel receivers 1012 may be powered or unpowered based on a control signal 1016 and may receive a signal from a target sampling point in a scene in a directed or undirected manner. For example, control circuitry 1002 may cause one or more of pixel receivers 1012 to be steered so as to receive a reflected signal from a target sampling point. In one example, control circuitry 1002 may cause a first subset of pixel receivers 1012 to be powered and a second subset of pixel receivers 1012 to be unpowered. The first subset of pixel receivers 1012 may receive signals from a default direction or may be steered so as to receive signals from specific target sampling points. In another example, control circuitry 1002 may cause all of pixel receivers 1012 to be powered on and may cause the pixel receivers 1012 to be steered so as to receive reflected signals from specific target sampling points. Pixel receivers 1012 may be powered on and/or steered simultaneously, concurrently, and/or sequentially. After receiving the reflected signals, data is sent to control circuitry 1002 from pixel receivers 1012 via data signal 1018.

Figure 10B:
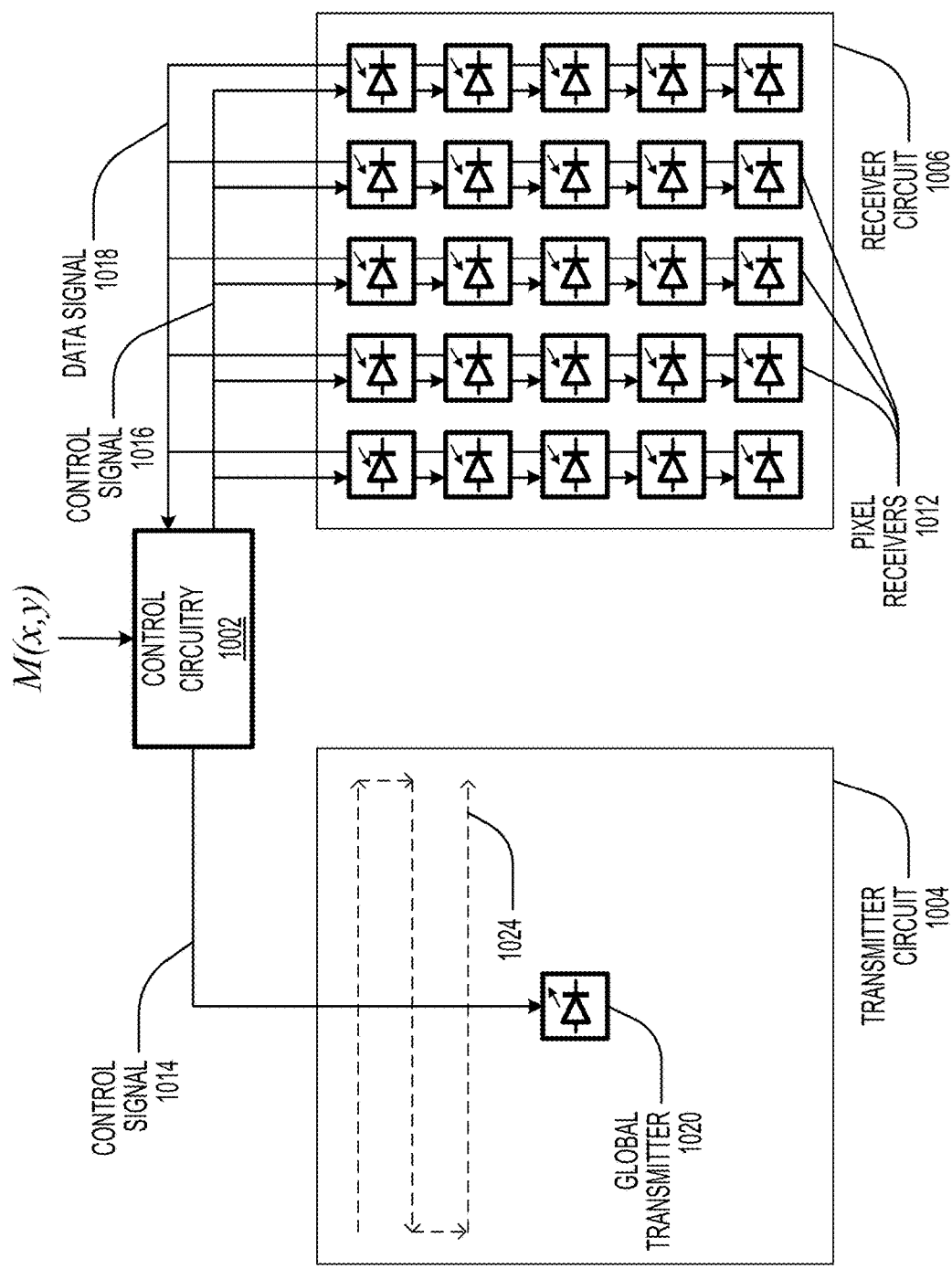

Referring to FIG. 10B, a depth sensor 1054B is illustrated having control circuitry 1002 communicatively coupled to transmitter circuit 1004 and receiver circuit 1006 via control signals 1014, 1016 and data signal 1018, as described previously. Depth sensor 1054B may differ from previous embodiments in that transmitter circuit 1004 includes a global transmitter 1020 instead of a plurality of pixel transmitters 1008. Global transmitter 1020 may be powered or unpowered based on control signal 1014 and, when powered, may transmit a signal toward all of the target sampling points simultaneously or sequentially. In one example, control circuitry 1002 may cause global transmitter 1020 to illuminate all of the target sampling points simultaneously. In another example, control circuitry 1002 may cause global transmitter 1020 to illuminate target sampling points sequentially in accordance with a scanning path 1024.

In some embodiments, depth sensor 1054B may include one or more features of the time-of-flight (ToF) imaging system for distance measurement described in reference to U.S. patent application Ser. No. 15/721,640 filed Sep. 29, 2017 titled "REAL TIME CALIBRATION FOR TIME-OF-FLIGHT DEPTH MEASUREMENT" and U.S. patent application Ser. No. 16/219,829 filed Dec. 13, 2018 titled "GLOBAL SHUTTER PIXEL CIRCUIT AND METHOD FOR COMPUTER VISION APPLICATIONS", the entire disclosures of which are hereby incorporated by reference as if fully set forth herein. For example, global transmitter 1020 may include the illuminator configured to transmit light pulses to illuminate a target object and pixel receivers 1012 may include the light-sensitive pixel array. The amount of light reaching pixel receivers 1012 may be controlled by control circuitry 1002 by opening and closing the electronic switches that act as shutters.

Figure 10C:
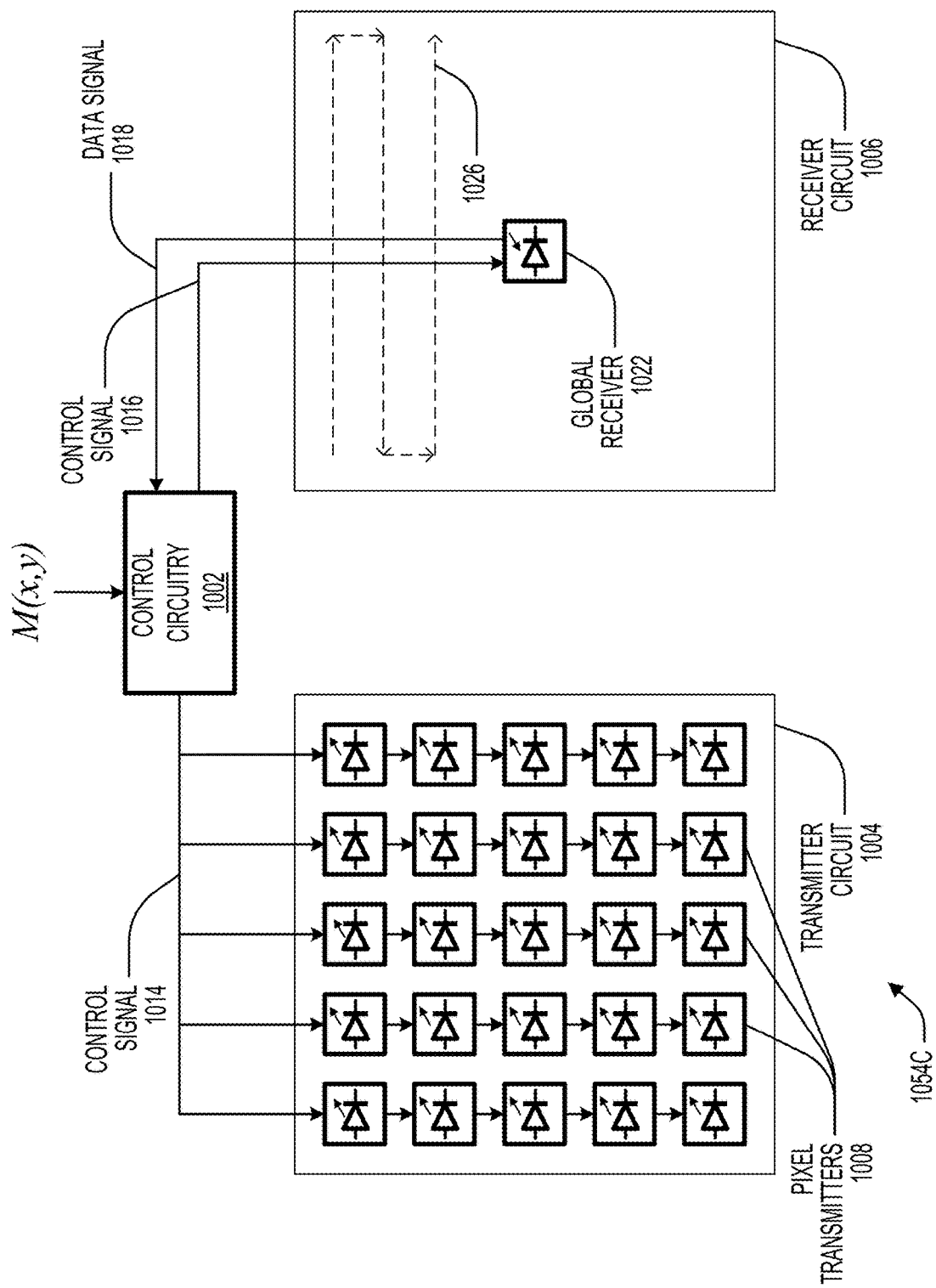

Referring to FIG. 10C, a depth sensor 1054C is illustrated having control circuitry 1002 communicatively coupled to transmitter circuit 1004 and receiver circuit 1006 via control signals 1014, 1016 and data signal 1018, as described previously. Depth sensor 1054C may differ from previous embodiments in that receiver circuit 1006 includes a global receiver 1022 instead of a plurality of pixel receivers 1012. Global receiver 1022 may be powered or unpowered based on control signal 1016 and, when powered, may receive reflected signals from all of the target sampling points simultaneously or sequentially. In one example, control circuitry 1002 may cause global receiver 1022 to receive reflected signals from target sampling points sequentially in accordance with a scanning path 1026.

Figure 10D:
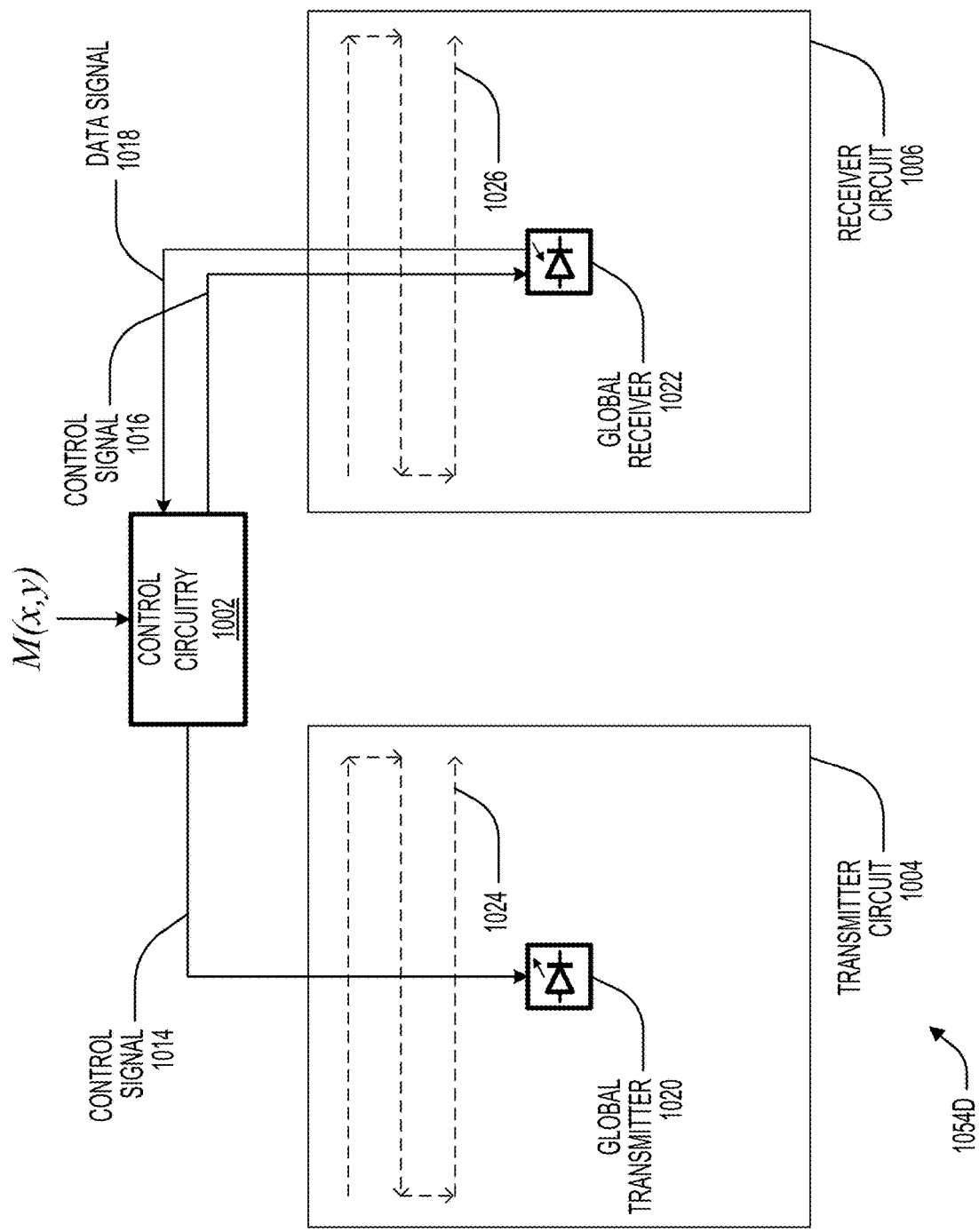

Referring to FIG. 10D, a depth sensor 1054D is illustrated having control circuitry 1002 communicatively coupled to transmitter circuit 1004 and receiver circuit 1006 via control signals 1014, 1016 and data signal 1018, as described previously. Depth sensor 1054D may differ from previous embodiments in that transmitter circuit 1004 includes global transmitter 1020 instead of pixel transmitters 1008 and receiver circuit 1006 includes global receiver 1022 instead of pixel receivers 1012. In one example, control circuitry 1002 may cause global transmitter 1020 to illuminate all of the target sampling points simultaneously while causing global receiver 1022 to receive reflected signals from target sampling points sequentially in accordance with scanning path 1026. In another example, control circuitry 1002 may cause global transmitter 1020 to illuminate target sampling points sequentially in accordance with scanning path 1024 while causing global receiver 1022 to receive reflected signals from all of the target sampling points simultaneously. In another example, control circuitry 1002 may cause global transmitter 1020 to illuminate target sampling points sequentially in accordance with scanning path 1024 simultaneously while causing global receiver 1022 to receive reflected signals from target sampling points sequentially in accordance with scanning path 1026. Other possibilities are contemplated.

Figure 11:
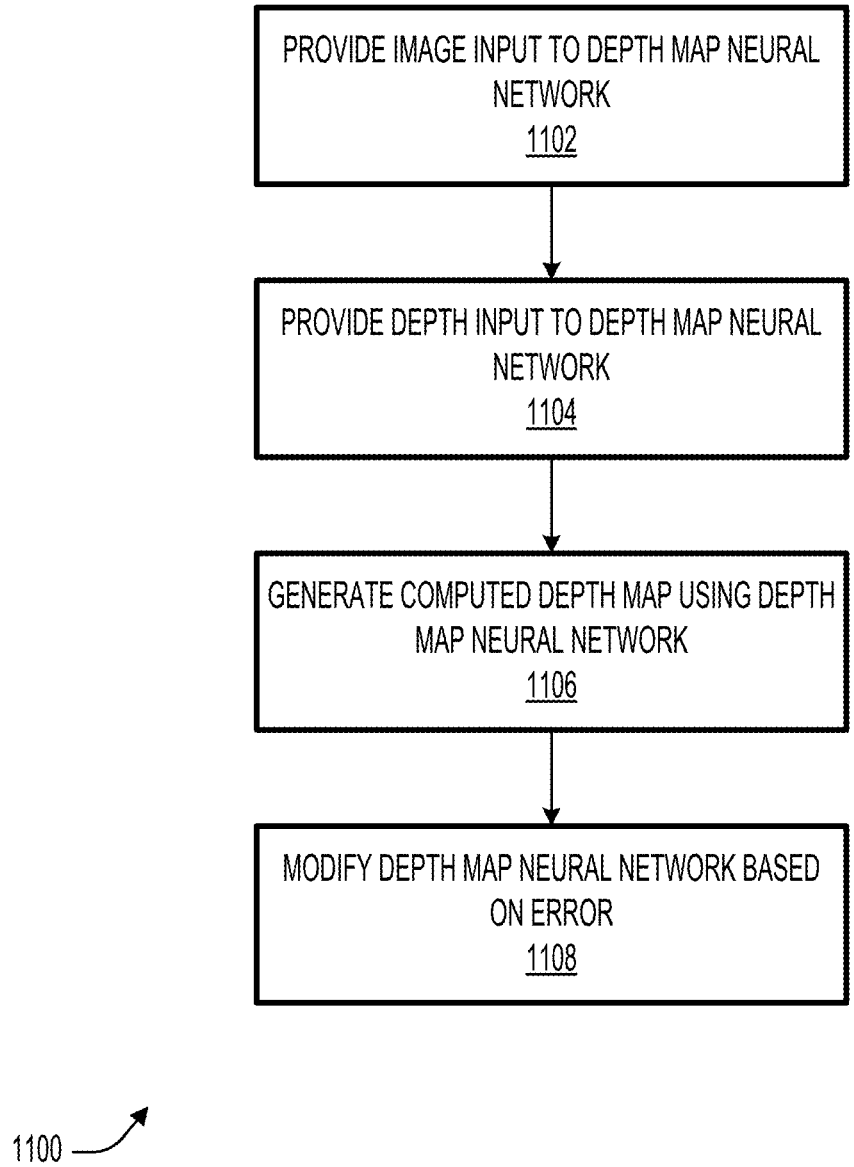
FIG. 11 illustrates a method for training a neural network, according to some embodiments of the present invention.

FIG. 11 illustrates a method 1100 for training a neural network (e.g., depth map neural network 256), according to some embodiments of the present invention. One or more steps of method 1100 may be performed in a different order than that shown in the illustrated embodiment, and one or more steps may be omitted during performance of method 1100. One or more steps of method 1100 may be performed by processor 252 or by another computing system.

At step 1102, an image input is provided to network 256. The image input may include a camera image of a training scene. The camera image may be captured/generated using a camera. The camera image may be a grayscale image having dimensions of H×W×1 or an RGB image having dimensions of H×W×3, among other possibilities.

At step 1104, a depth input is provided to network 256. The depth input may be based at least in part on a high-density depth map of the training scene. The high-density depth map may be captured/generated using a high-density depth sensor. The depth input may include a sparse depth map generated based on the high-density depth map and a sampling mask that indicates a plurality of sampling points. For example, the sparse depth map may be generated by, for each of the plurality of sampling points, setting the sparse depth map equal to the high-density depth map and, for each of a plurality of remaining points, setting the sparse depth map equal to the high-density depth map at a nearest point of the plurality of sampling points. The depth input may further include a distance map generated by, for each of the plurality of sampling points, setting the distance map equal to zero and, for each of a plurality of remaining points, setting the distance map equal to a distance from a nearest point of the plurality of sampling points. The number of samples and the locations of the samples of the plurality of sampling points may be based on the capabilities or the settings of a low-density depth sensor to be used in runtime mode.

At step 1106, a computed depth map of the training scene is generated using network 256. The computed depth map may be generated by network 256 based on the image input and the depth input. In some embodiments, step 1106 optionally includes the steps of receiving the computed depth map from network 256 and/or causing network 256 to generate the computed depth map. In some embodiments, step 1106 includes generating an error between the computed depth map and the high-density depth map and (optionally) using the error to generate the computed depth map.

At step 1108, network 256 is modified based on an error between the computed depth map and the high-density depth map. Network 256 may self-correct based on the error or network 256 may be modified by an external process, among other possibilities.

Figure 12:
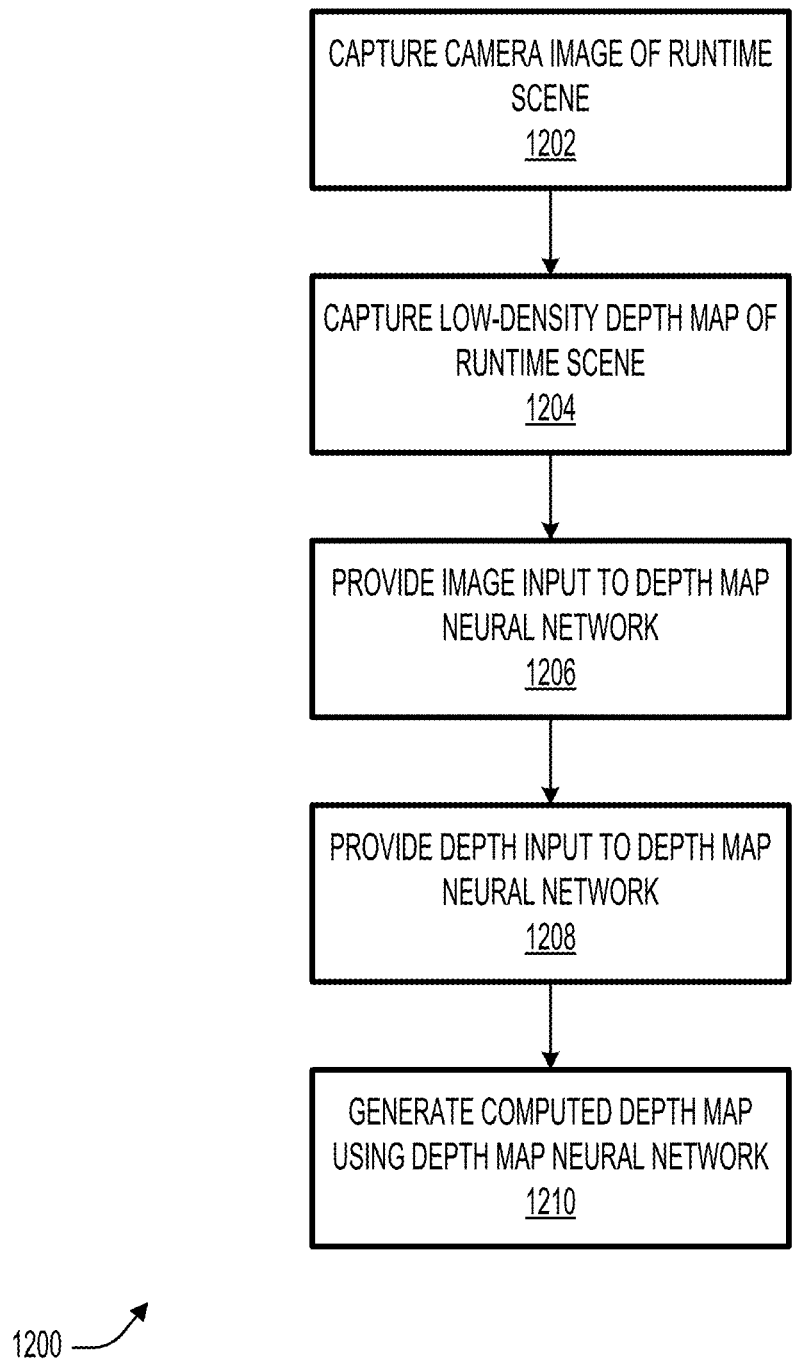
FIG. 12 illustrates a method for computing depth maps using a neural network, according to some embodiments of the present invention.

FIG. 12 illustrates a method 1200 for computing depth maps using a neural network (e.g., depth map neural network 256), according to some embodiments of the present invention. One or more steps of method 1200 may be performed in a different order than that shown in the illustrated embodiment, and one or more steps may be omitted during performance of method 1200. One or more steps of method 1200 may be performed by processor 252 or by another computing system.

At step 1202, a camera image of a runtime scene is captured using a camera. The camera image may be a grayscale image having dimensions of H×W×1 or an RGB image having dimensions of H×W×3, among other possibilities. The camera used to capture the camera image of the runtime scene may be the same or different than the camera used to capture the camera image of the training scene, as described in reference to method 1100.

At step 1204, a low-density depth map of the runtime scene is captured using a low-density depth sensor. The low-density depth map may contain non-zero depth values at a plurality of sampling points. The number of samples and the locations of the samples of the plurality of sampling points may be based on the capabilities or the settings of the low-density depth sensor. In some embodiments, the low-density depth map may be equivalent or may be similar to a sampled version of a high-density depth map of the runtime scene at a plurality of sampling points.

At step 1206, an image input is provided to network 256. The image input may include the camera image of the runtime scene captured in step 1202.

At step 1208, a depth input is provided to network 256. The depth input may be based at least in part on the low-density depth map of the runtime scene captured in step 1204. The depth input may include a sparse depth map of the runtime scene generated based on the low-density depth map of the runtime scene. For example, the sparse depth map of the runtime scene may be generated by, for each of a plurality of sampling points, setting the sparse depth map of the runtime scene equal to the low-density depth map of the runtime scene and, for each of a plurality of remaining points, setting the sparse depth map of the runtime scene equal to the low-density depth map of the runtime scene at a nearest point of the plurality of sampling points. The depth input may further include a distance map of the runtime scene generated based on the low-density depth map of the runtime scene and/or the plurality of sampling points. For example, the distance map of the runtime scene may be generated by, for each of the plurality of sampling points, setting the distance map of the runtime scene equal to zero and, for each of a plurality of remaining points, setting the distance map of the runtime scene equal to a distance from a nearest point of the plurality of sampling points.

At step 1210, a computed depth map of the runtime scene is generated using network 256. The computed depth map of the runtime scene may be generated by network 256 based on the image input and the depth input. For example, network 256 may generate the computed depth map of the runtime scene upon receiving the image input and the depth input as inputs. In some embodiments, step 1210 optionally includes the steps of receiving the computed depth map of the runtime scene from network 256 and/or causing network 256 to generate the computed depth map of the runtime scene. In some embodiments, step 1210 includes generating an error and using the error to generate the computed depth map of the runtime scene.

Figure 13:
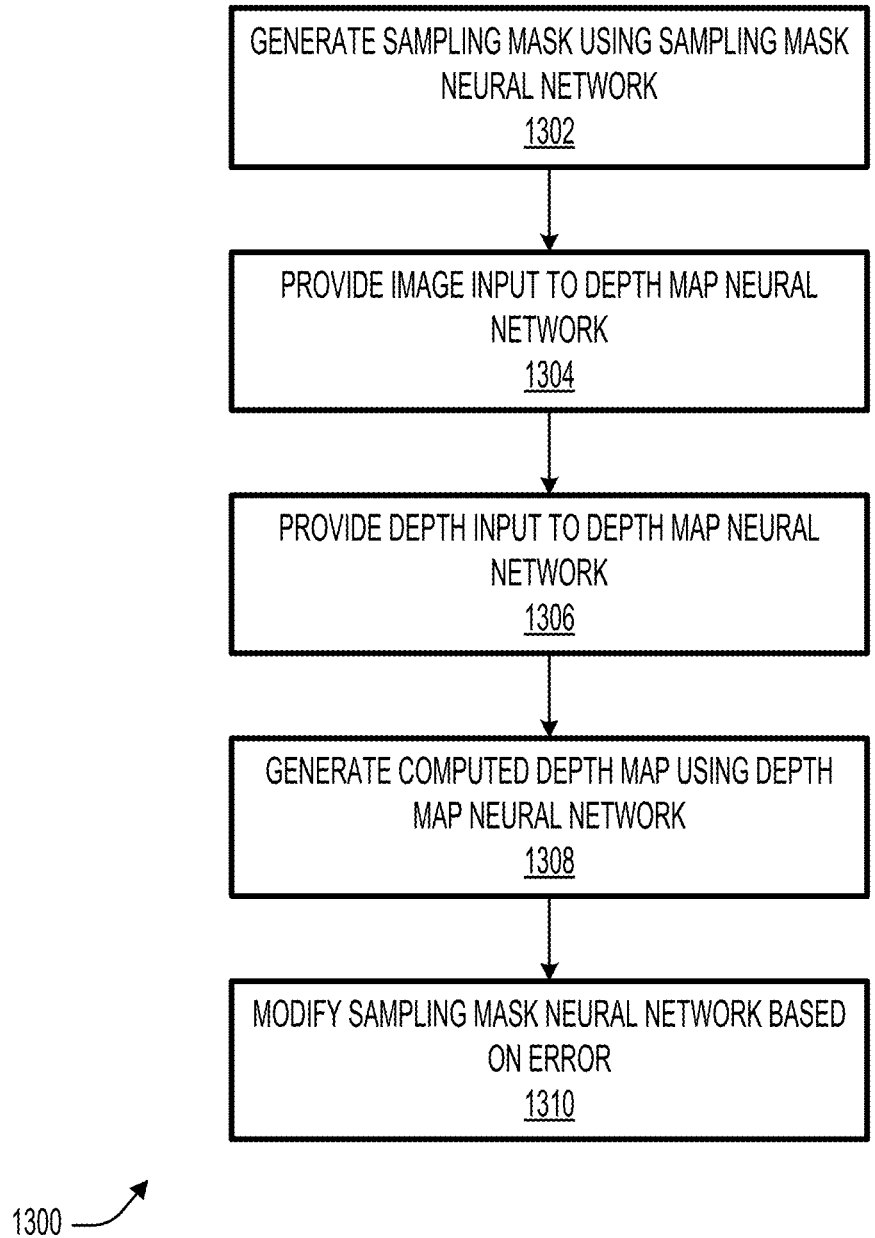
FIG. 13 illustrates a method for training a neural network, according to some embodiments of the present invention.

FIG. 13 illustrates a method 1300 for training a neural network (e.g., sampling mask neural network 272), according to some embodiments of the present invention. One or more steps of method 1300 may be performed in a different order than that shown in the illustrated embodiment, and one or more steps may be omitted during performance of method 1300. One or more steps of method 1300 may be performed by processor 252 or by another computing system.

At step 1302, a sampling mask comprising a plurality of target sampling points is generated by network 272. The sampling mask may be generated by network 272 based on a camera image of a training scene. The plurality of target sampling points may correspond to locations at which depth measurements of the training scene are to be captured. The camera image may be captured/generated using a camera. In some embodiments, step 1302 optionally includes the steps of receiving the sampling mask from network 272 and/or causing network 272 to generate the sampling mask.

At step 1304, an image input is provided to network 256. The image input may include the camera image.

At step 1306, a depth input is provided to network 256. The depth input may be based at least in part on a high-density depth map of the training scene. The high-density depth map may be captured/generated using a high-density depth sensor. The depth input may include a sparse depth map generated based on the high-density depth map and the plurality of target sampling points of the sampling mask. For example, the sparse depth map may be generated by, for each of the plurality of target sampling points, setting the sparse depth map equal to the high-density depth map and, for each of a plurality of remaining points, setting the sparse depth map equal to the high-density depth map at a nearest point of the plurality of target sampling points. The depth input may further include a distance map generated by, for each of the plurality of target sampling points, setting the distance map equal to zero and, for each of a plurality of remaining points, setting the distance map equal to a distance from a nearest point of the plurality of target sampling points.

At step 1308, a computed depth map of the training scene is generated using network 256. The computed depth map may be generated by network 256 based on the image input and the depth input. In some embodiments, step 1308 optionally includes the steps of receiving the computed depth map from network 256 and/or causing network 256 to generate the computed depth map. In some embodiments, step 1308 includes generating an error between the computed depth map and the high-density depth map and (optionally) using the error to generate the computed depth map.

At step 1310, network 272 is modified based on an error between the computed depth map and the high-density depth map. Network 272 may self-correct based on the error or network 272 may be modified by an external process, among other possibilities.

Figure 14:
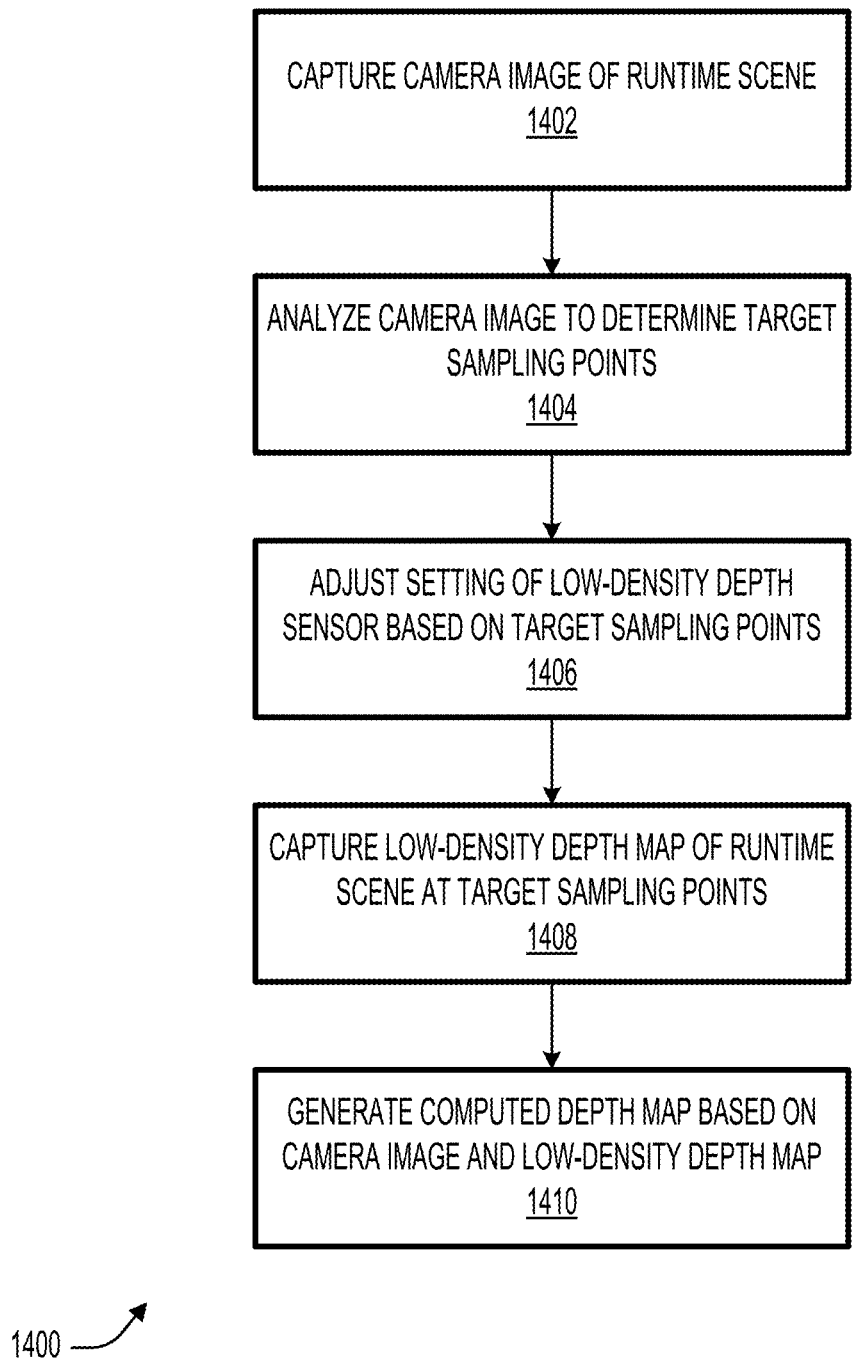
FIG. 14 illustrates a method for computing depth maps, according to some embodiments of the present invention.

FIG. 14 illustrates a method 1400 for computing depth maps, according to some embodiments of the present invention. One or more steps of method 1400 may be performed in a different order than that shown in the illustrated embodiment, and one or more steps may be omitted during performance of method 1400. One or more steps of method 1400 may be performed by processor 252 or by another computing system.

At step 1402, a camera image of a runtime scene is captured using a camera. The camera image may be a grayscale image having dimensions of H×W×1 or an RGB image having dimensions of H×W×3, among other possibilities. The camera used to capture the camera image of the runtime scene may be the same or different than the camera used to capture the camera image of the training scene, as described in reference to method 1300.

At step 1404, the camera image of the runtime scene is analyzed to determine a plurality of target sampling points. The plurality of target sampling points may correspond to locations at which depth measurements of the runtime scene are to be captured. In some embodiments, step 1404 includes detecting one or more interest points in the camera image and determining the plurality of target sampling points based on the one or more interest points. In some embodiments, step 1404 includes using a neural network (e.g., sampling mask neural network 272) to determine the plurality of target sampling points. For example, network 272 may be trained to generate the plurality of target sampling points upon receiving the camera image as input.

At step 1406, a setting associated with a low-density depth sensor is adjusted based on the plurality of target sampling points. A setting associated with the low-density depth sensor may be a control signal feeding the depth sensor, code executed by the depth sensor, one or more variables governing operation of the depth sensor, and the like. In some embodiments, step 1406 (and/or step 1408) includes causing a transmitter of the low-density depth sensor to transmit signals to the plurality of target sampling points and causing a subset of a plurality of pixel receivers of the low-density depth sensor to be powered so as to receive reflected signals from the plurality of target sampling points. In some embodiments, step 1406 (and/or step 1408) includes causing a transmitter of the low-density depth sensor to sequentially transmit signals to the plurality of target sampling points and causing a receiver of the low-density depth sensor to receive reflected signals from the plurality of target sampling points.

At step 1408, a low-density depth map of the runtime scene is captured at the plurality of target sampling points using the low-density depth sensor. The low-density depth map may contain non-zero depth values at a plurality of target sampling points. In some embodiments, the low-density depth map may be equivalent or may be similar to a sampled version of a high-density depth map of the runtime scene at a plurality of target sampling points.

At step 1410, a computed depth map of the runtime scene is generated based on the camera image and the low-density depth map. In some embodiments, the computed depth map of the runtime scene is generated by a neural network (e.g., depth map neural network 256) based on an image input and a depth input. The image input may include the camera image and the depth input may include and/or may be based on the plurality of target sampling points and/or the low-density depth map. In some examples, network 256 may generate the computed depth map of the runtime scene upon receiving the image input and the depth input as inputs. In some embodiments, step 1410 optionally includes the steps of receiving the computed depth map of the runtime scene from network 256 and/or causing network 256 to generate the computed depth map of the runtime scene. In some embodiments, step 1410 includes generating an error and using the error to generate the computed depth map of the runtime scene.

Figure 15:
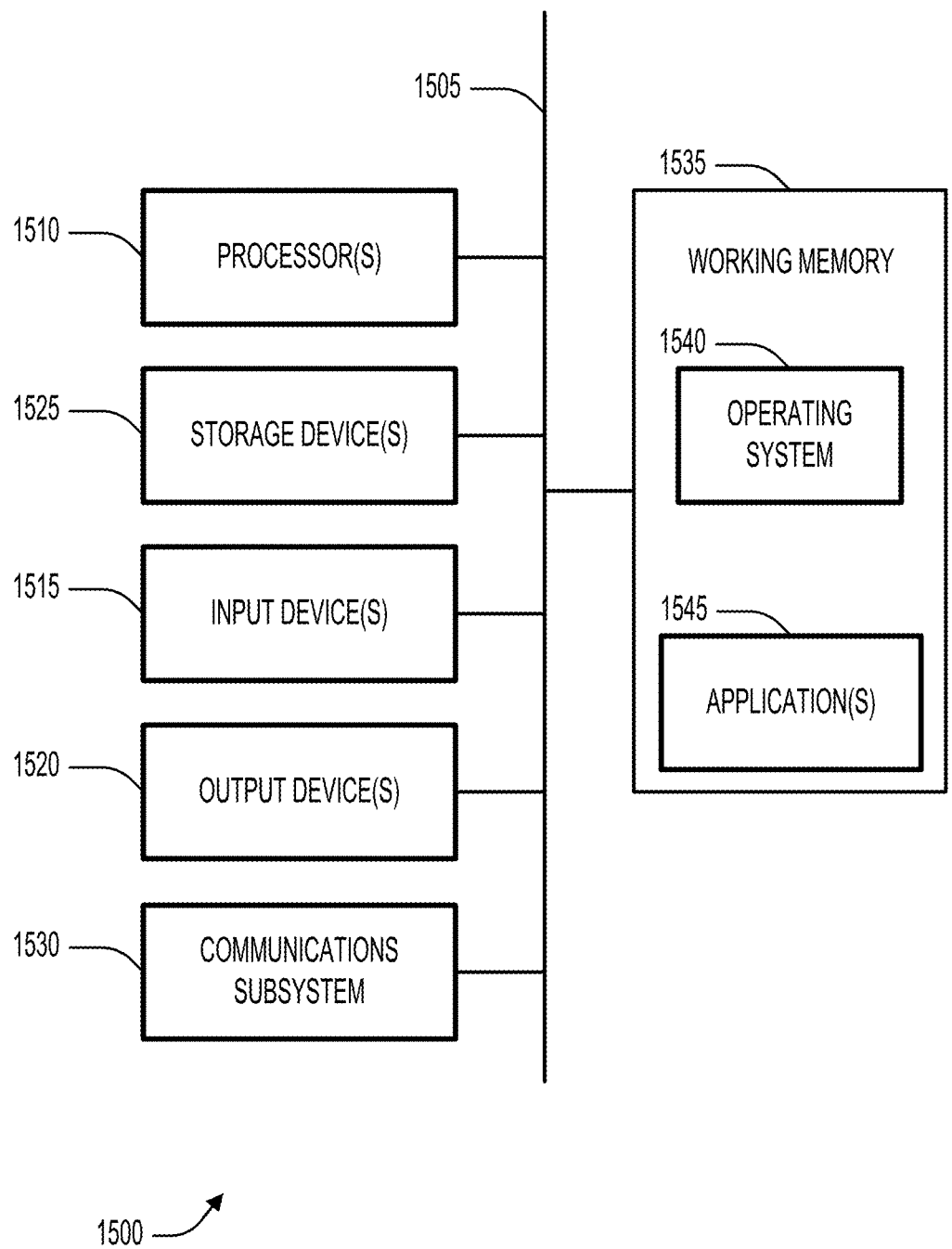
FIG. 15 illustrates a simplified computer system according to an embodiment described herein.

FIG. 15 illustrates a simplified computer system 1500 according to an embodiment described herein. Computer system 1500 as illustrated in FIG. 15 may be incorporated into devices such as AR device 200 as described herein. FIG. 15 provides a schematic illustration of one embodiment of computer system 1500 that can perform some or all of the steps of the methods provided by various embodiments. It should be noted that FIG. 15 is meant only to provide a generalized illustration of various components, any or all of which may be utilized as appropriate. FIG. 15, therefore, broadly illustrates how individual system elements may be implemented in a relatively separated or relatively more integrated manner.

Computer system 1500 is shown comprising hardware elements that can be electrically coupled via a bus 1505, or may otherwise be in communication, as appropriate. The hardware elements may include one or more processors 1510, including without limitation one or more general-purpose processors and/or one or more special-purpose processors such as digital signal processing chips, graphics acceleration processors, and/or the like; one or more input devices 1515, which can include without limitation a mouse, a keyboard, a camera, and/or the like; and one or more output devices 1520, which can include without limitation a display device, a printer, and/or the like.

Computer system 1500 may further include and/or be in communication with one or more non-transitory storage devices 1525, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

Computer system 1500 might also include a communications subsystem 1530, which can include without limitation a modem, a network card (wireless or wired), an infrared communication device, a wireless communication device, and/or a chipset such as a Bluetooth™ device, an 802.11 device, a WiFi device, a WiMax device, cellular communication facilities, etc., and/or the like. The communications subsystem 1530 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 1530. In other embodiments, a portable electronic device, e.g. the first electronic device, may be incorporated into computer system 1500, e.g., an electronic device as an input device 1515. In some embodiments, computer system 1500 will further comprise a working memory 1535, which can include a RAM or ROM device, as described above.

Computer system 1500 also can include software elements, shown as being currently located within the working memory 1535, including an operating system 1540, device drivers, executable libraries, and/or other code, such as one or more application programs 1545, which may comprise computer programs provided by various embodiments, and/or may be designed to implement methods, and/or configure systems, provided by other embodiments, as described herein. Merely by way of example, one or more procedures described with respect to the methods discussed above, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 1525 described above. In some cases, the storage medium might be incorporated within a computer system, such as computer system 1500. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by computer system 1500 and/or might take the form of source and/or installable code, which, upon compilation and/or installation on computer system 1500 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as computer system 1500 to perform methods in accordance with various embodiments of the technology. According to a set of embodiments, some or all of the procedures of such methods are performed by computer system 1500 in response to processor 1510 executing one or more sequences of one or more instructions, which might be incorporated into the operating system 1540 and/or other code, such as an application program 1545, contained in the working memory 1535. Such instructions may be read into the working memory 1535 from another computer-readable medium, such as one or more of the storage device(s) 1525. Merely by way of example, execution of the sequences of instructions contained in the working memory 1535 might cause the processor(s) 1510 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using computer system 1500, various computer-readable media might be involved in providing instructions/code to processor(s) 1510 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 1525. Volatile media include, without limitation, dynamic memory, such as the working memory 1535.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 1510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by computer system 1500.

The communications subsystem 1530 and/or components thereof generally will receive signals, and the bus 1505 then might carry the signals and/or the data, instructions, etc. carried by the signals to the working memory 1535, from which the processor(s) 1510 retrieves and executes the instructions. The instructions received by the working memory 1535 may optionally be stored on a non-transitory storage device 1525 either before or after execution by the processor(s) 1510.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of computing depth maps, the method comprising: capturing, using a camera, a camera image of a runtime scene; analyzing the camera image of the runtime scene to determine a plurality of target sampling points at which to capture depth of the runtime scene, wherein the plurality of target sampling points are determined using a neural network having been previously trained using a camera image of a training scene captured by the camera and a high-density depth map of the training scene captured by a high-density depth sensor; adjusting a setting associated with a low-density depth sensor based on the plurality of target sampling points such that the low-density depth sensor is configured to capture depths of the runtime scene at each of the plurality of target sampling points; capturing, using the low-density depth sensor, a low-density depth map of the runtime scene at the plurality of target sampling points, wherein adjusting the setting includes causing a first subset of a plurality of pixel receivers of the low-density depth sensor to be powered and a second subset of the plurality of pixel receivers to be unpowered, wherein the first subset corresponds to the plurality of target sampling points, and wherein powering the first subset causes the first subset to receive reflected signals from the plurality of target sampling points; and generating a computed depth map of the runtime scene based on the camera image of the runtime scene and the low-density depth map of the runtime scene.

2. The method of claim 1, wherein analyzing the camera image of the runtime scene to determine the plurality of target sampling points includes: detecting one or more interest points in the camera image of the runtime scene; and determining the plurality of target sampling points based on the one or more interest points.

3. The method of claim 1, wherein analyzing the camera image of the runtime scene to determine the plurality of target sampling points includes: generating, using the neural network, the plurality of target sampling points based on the camera image of the runtime scene.

4. The method of claim 1, wherein adjusting the setting associated with the low-density depth sensor based on the plurality of target sampling points includes: causing a transmitter of the low-density depth sensor to transmit signals to the plurality of target sampling points.

5. The method of claim 1, wherein adjusting the setting associated with the low-density depth sensor based on the plurality of target sampling points includes: causing a transmitter of the low-density depth sensor to sequentially transmit signals to the plurality of target sampling points; and causing a receiver of the low-density depth sensor to receive reflected signals from the plurality of target sampling points.

6. The method of claim 1, wherein generating the computed depth map of the runtime scene based includes: generating, using the neural network, the computed depth map of the runtime scene based on the camera image of the runtime scene and the low-density depth map of the runtime scene.

7. A system for computing depth maps, the system comprising: a camera; a low-density depth sensor; and one or more processors configured to perform operations including: capturing, using the camera, a camera image of a runtime scene; analyzing the camera image of the runtime scene to determine a plurality of target sampling points at which to capture depth of the runtime scene, wherein the plurality of target sampling points are determined using a neural network having been previously trained using a camera image of a training scene captured by the camera and a high-density depth map of the training scene captured by a high-density depth sensor; adjusting a setting associated with the low-density depth sensor based on the plurality of target sampling points such that the low-density depth sensor is configured to capture depths of the runtime scene at each of the plurality of target sampling points; capturing, using the low-density depth sensor, a low-density depth map of the runtime scene at the plurality of target sampling points, wherein adjusting the setting includes causing a first subset of a plurality of pixel receivers of the low-density depth sensor to be powered and a second subset of the plurality of pixel receivers to be unpowered, wherein the first subset corresponds to the plurality of target sampling points, and wherein powering the first subset causes the first subset to receive reflected signals from the plurality of target sampling points; and generating a computed depth map of the runtime scene based on the camera image of the runtime scene and the low-density depth map of the runtime scene.

8. The system of claim 7, wherein analyzing the camera image of the runtime scene to determine the plurality of target sampling points includes: detecting one or more interest points in the camera image of the runtime scene; and determining the plurality of target sampling points based on the one or more interest points.

9. The system of claim 7, wherein analyzing the camera image of the runtime scene to determine the plurality of target sampling points includes: generating, using the neural network, the plurality of target sampling points based on the camera image of the runtime scene.

10. The system of claim 7, wherein adjusting the setting associated with the low-density depth sensor based on the plurality of target sampling points includes: causing a transmitter of the low-density depth sensor to transmit signals to the plurality of target sampling points.

11. The system of claim 7, wherein adjusting the setting associated with the low-density depth sensor based on the plurality of target sampling points includes: causing a transmitter of the low-density depth sensor to sequentially transmit signals to the plurality of target sampling points; and causing a receiver of the low-density depth sensor to receive reflected signals from the plurality of target sampling points.

12. The system of claim 7, wherein generating the computed depth map of the runtime scene based includes: generating, using the neural network, the computed depth map of the runtime scene based on the camera image of the runtime scene and the low-density depth map of the runtime scene.

13. A non-transitory computer-readable medium comprising instructions that, when executed by a processor, cause the processor to perform operations comprising: capturing, using a camera, a camera image of a runtime scene; analyzing the camera image of the runtime scene to determine a plurality of target sampling points at which to capture depth of the runtime scene, wherein the plurality of target sampling points are determined using a neural network having been previously trained using a camera image of a training scene captured by the camera and a high-density depth map of the training scene captured by a high-density depth sensor; adjusting a setting associated with a low-density depth sensor based on the plurality of target sampling points such that the low-density depth sensor is configured to capture depths of the runtime scene at each of the plurality of target sampling points; capturing, using the low-density depth sensor, a low-density depth map of the runtime scene at the plurality of target sampling points, wherein adjusting the setting includes causing a first subset of a plurality of pixel receivers of the low-density depth sensor to be powered and a second subset of the plurality of pixel receivers to be unpowered, wherein the first subset corresponds to the plurality of target sampling points, and wherein powering the first subset causes the first subset to receive reflected signals from the plurality of target sampling points; and generating a computed depth map of the runtime scene based on the camera image of the runtime scene and the low-density depth map of the runtime scene.

14. The non-transitory computer-readable medium of claim 13, wherein analyzing the camera image of the runtime scene to determine the plurality of target sampling points includes: detecting one or more interest points in the camera image of the runtime scene; and determining the plurality of target sampling points based on the one or more interest points.

15. The non-transitory computer-readable medium of claim 13, wherein analyzing the camera image of the runtime scene to determine the plurality of target sampling points includes: generating, using the neural network, the plurality of target sampling points based on the camera image of the runtime scene.

16. The non-transitory computer-readable medium of claim 13, wherein adjusting the setting associated with the low-density depth sensor based on the plurality of target sampling points includes: causing a transmitter of the low-density depth sensor to transmit signals to the plurality of target sampling points.

17. The non-transitory computer-readable medium of claim 13, wherein adjusting the setting associated with the low-density depth sensor based on the plurality of target sampling points includes: causing a transmitter of the low-density depth sensor to sequentially transmit signals to the plurality of target sampling points; and causing a receiver of the low-density depth sensor to receive reflected signals from the plurality of target sampling points.

* * * * *